US009015288B2

(12) United States Patent
Kawai et al.

(10) Patent No.: US 9,015,288 B2
(45) Date of Patent: Apr. 21, 2015

(54) WIRELESS CONNECTION SETTING PROGRAM

(75) Inventors: Sunao Kawai, Toyoake (JP); Manabu Isshiki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 392 days.

(21) Appl. No.: 12/572,307

(22) Filed: Oct. 2, 2009

(65) Prior Publication Data

US 2010/0017847 A1 Jan. 21, 2010

Related U.S. Application Data

(63) Continuation of application No. 11/392,928, filed on Mar. 30, 2006, now abandoned.

(30) Foreign Application Priority Data

Mar. 31, 2005 (JP) .................................. 2005-104454

(51) Int. Cl.
*G06F 15/177* (2006.01)
*H04L 12/24* (2006.01)
*H04W 8/00* (2009.01)
(Continued)

(52) U.S. Cl.
CPC ............ *H04L 41/22* (2013.01); *H04L 41/0803* (2013.01); *H04L 41/0806* (2013.01); *H04W 8/005* (2013.01); *H04W 12/00* (2013.01); *H04W 48/16* (2013.01)

(58) Field of Classification Search
CPC .. H04L 41/0806; H04L 41/0803; H04L 41/22
See application file for complete search history.

(56) References Cited

U.S. PATENT DOCUMENTS 7,110,784 B2 9/2006 Hasu et al.
7,155,437 B2 * 12/2006 Chang et al. .................. 709/223
(Continued)

FOREIGN PATENT DOCUMENTS

JP 2003-023662 A 1/2003
JP 2004-086492 A 3/2004
(Continued)

OTHER PUBLICATIONS

Notification of Reasons of Rejection dated Dec. 18, 2007 in Japanese Application No. 2005-104454 and English translation thereof.

*Primary Examiner* — Hieu Hoang
*Assistant Examiner* — Nam Tran
(74) *Attorney, Agent, or Firm* — Banner & Witcoff, Ltd.

(57) ABSTRACT

A computer program product includes computer readable instructions that cause a computer to execute a wireless connection setting process. The computer includes a communication interface configured to communicate with at least one device. The wireless connection setting process includes recognizing a state of the at least one device through the communication interface, displaying an input screen image sequentially for each of at least one setting item of wireless connection settings, configuring the wireless connection settings for the at least one device based upon the input, and controlling whether to display the input screen image by judging whether the input is required to be received for each of the at least one setting item based upon the state of the recognized at least one device. Configuring the wireless connection settings includes determining the setting item for which the input is not judged required to be received.

21 Claims, 13 Drawing Sheets

(51) Int. Cl.
    *H04W 12/00*    (2009.01)
    *H04W 48/16*    (2009.01)

(56) References Cited

U.S. PATENT DOCUMENTS

| | | | |
|---|---|---|---|
| 7,290,067 | B2* | 10/2007 | Fukunaga et al. ................. 710/8 |
| 7,451,222 | B2* | 11/2008 | Sullivan ........................ 709/221 |
| 2002/0007407 | A1* | 1/2002 | Klein ............................ 709/222 |
| 2002/0101343 | A1* | 8/2002 | Patton ........................... 340/505 |
| 2002/0176366 | A1* | 11/2002 | Ayyagari et al. ............... 370/245 |
| 2005/0125693 | A1* | 6/2005 | Duplessis et al. ............. 713/201 |
| 2006/0105714 | A1* | 5/2006 | Hall et al. .................... 455/41.3 |
| 2006/0106918 | A1* | 5/2006 | Evert et al. .................... 709/220 |

FOREIGN PATENT DOCUMENTS

| | | |
|---|---|---|
| JP | 2004-104774 A | 4/2004 |
| JP | 2004-179872 A | 6/2004 |

\* cited by examiner

FIG. 5
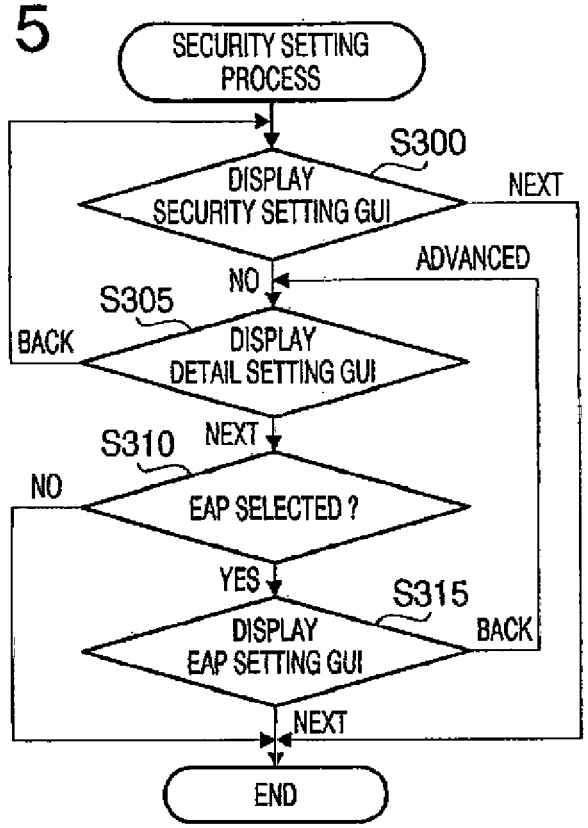
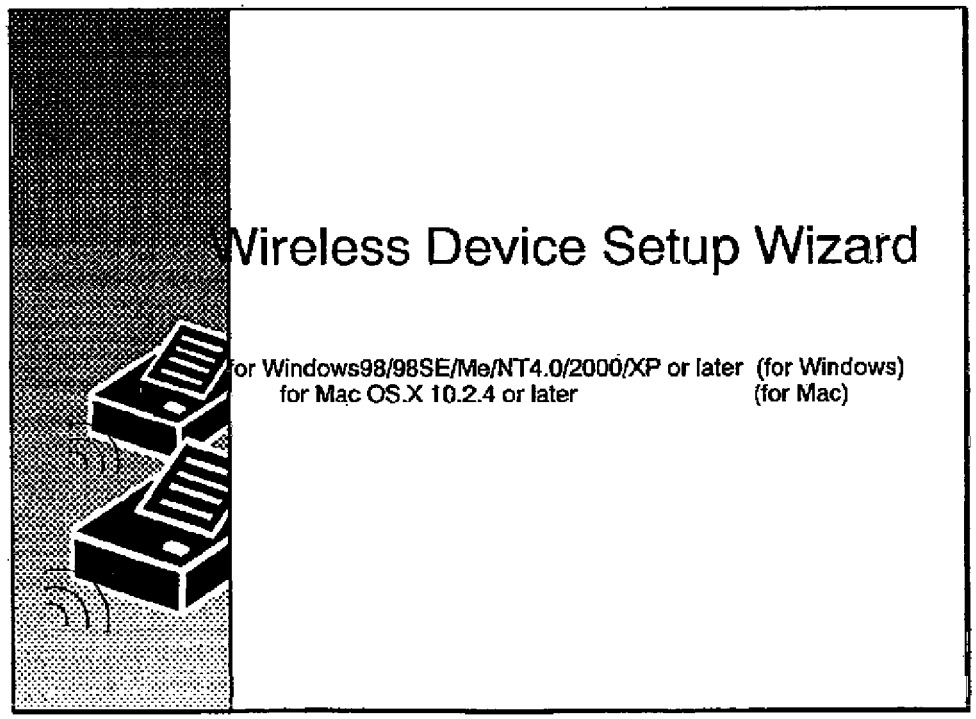
FIG. 6

WIRELESS CONNECTION SETTING PROGRAM

CROSS-REFERENCE TO RELATED APPLICATIONS

The present application is a continuation of pending U.S. application Ser. No. 11/392,928, filed Mar. 30, 2006, which claims priority under 35 U.S.C. §119 from Japanese Patent Application No. 2005-104454, filed on Mar. 31, 2005. The entire subject matters of these applications are incorporated herein by reference.

BACKGROUND

1. Technical Field

The following description relates to one or more techniques that may be used to configure setting for a wireless connection between a computer and a device.

2. Related Art

Conventionally, in order to allow various kinds of devices such as a printing device (a printer, Multi Function Peripheral (MFP), etc.) to join a wireless network, various settings necessary for joining the wireless network are configured using a setup wizard. A setup wizard is a program designed to configure such various settings, generally run by a personal computer (PC) on the wireless network.

It is noted that the setup wizard is generally set to allow the device to join the wireless network only with a user inputting necessary information for each of setting items to be set on an input screen image that is sequentially displayed for each of the setting items.

Meanwhile, currently, the wireless network is widely used not only in offices, but also in general homes. However, in the case of the aforementioned conventional setup wizard, as shown in FIG. 19, a user has to input the necessary information for specifying a device to be made join the wireless network and a wireless access point to be used. For this reason, even in the case of configuring simple settings for the wireless network with only one device to be connected to the wireless network and one wireless access point, a lot of trouble is required for setting the wireless network.

In addition, since the user has to input even information, which a certain level of technical knowledge about the wireless network is required for inputting, such as information for specifying an "SSID (Service Set Identifier)" or "Channel", there is a problem that those who do not have sufficient technical knowledge about the wireless network as some general users, cannot easily configure the settings for the wireless network. One example of such a problem is shown in FIG. 19.

SUMMARY

Aspects of the present invention are advantageous in that one or more techniques that allow a user to easily configure settings for a wireless connection between a computer and a device can be provided.

BRIEF DESCRIPTION OF THE ACCOMPANYING DRAWINGS

FIG. 1 schematically shows a configuration of a personal computer (PC) according to one or more aspects the present invention.

FIG. 5 is a flowchart showing a procedure of the security setting process in the main setting process in accordance with one or more aspects of the present invention.

FIG. 6 is an illustration showing an example of a start screen image displayed on a display device in accordance with one or more aspects of the present invention.

DETAILED DESCRIPTION

Figure 1:
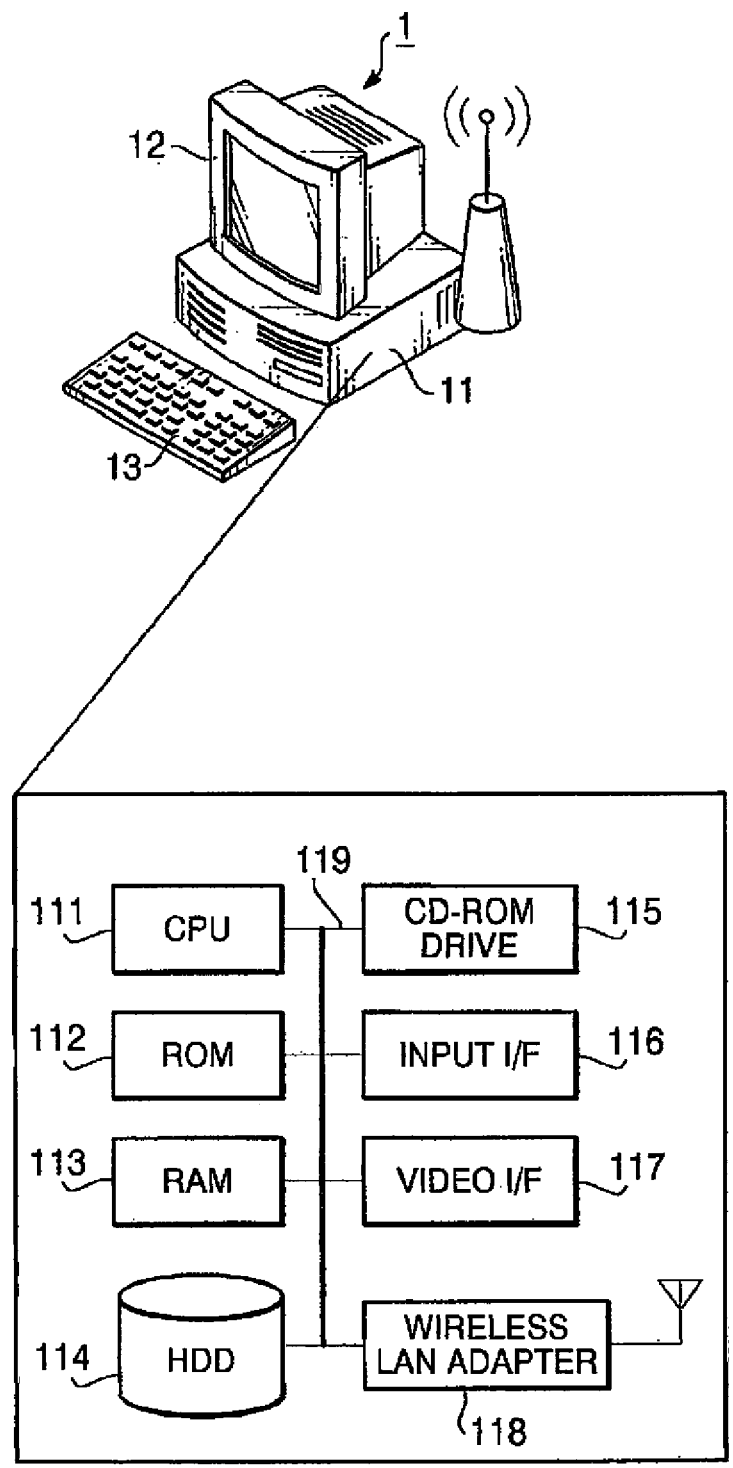

It is noted that various connections are set forth between elements in the following description. It is noted that these connections in general and, unless specified otherwise, may be direct or indirect and that this specification is not intended to be limiting in this respect.

General Overview

According to aspects of the present invention, there is provided a computer program product including computer readable instructions that cause a computer to execute a wireless connection setting process, the computer including a communication interface configured to communicate with at least one device, the wireless connection setting process being executed in response to the computer receiving an external setting request for configuring wireless connection settings that may be used to make the at least one device join a wireless network, the wireless connection setting process including: recognizing a state of the at least one device through the communication interface; displaying an input screen image sequentially for each of at least one setting item, to be set, of the wireless connection settings, the input screen image being designed for receiving an input for each of the at least one setting item thereon; configuring the wireless connection settings for the at least one device based upon the input; and controlling whether to display the input screen image for each of the at least one setting item of the wireless connection settings in said displaying the input screen image, by judging whether the input is required to be received for each of the at least one setting item based upon the state of the at least one device that is recognized in said recognizing the state of the at least one device. Said configuring the wireless connection settings includes determining the setting item for which the input is not judged required to be received in said controlling whether to display the input screen image based upon the state of the at least one device recognized in said recognizing the state of the at least one device.

By the instructions, included in the computer program product thus configured, making the computer execute the wireless connection setting process, when receiving the setting request, the computer recognizes the state of the at least one device through the communication interface, and sequentially displays the input screen image. Meanwhile, based on the state of the at least one device, the computer judges whether the input is required to be provided for each of the at least one setting item, so as to control whether to display the input screen image for each of the at least one setting item (that is, forbid displaying the input screen image for a setting item for which the input is not judged required to be provided). In the case of a setting item for which the input is judged required to be provided, based on the input provided on the input screen image, the wireless connection settings are configured to be applied to the at least one device. On the other hand, in the case of a setting item for which the input is not judged required to be provided, according to a basis for the judgment, the wireless connection settings are configured to be applied to the at least one device.

Namely, in the computer that executes the wireless connection setting process according to the instructions included in the computer program product, the input screen image for the setting item, for which is not judged required to be provided based upon the state of the recognized device, can be skipped. Therefore, a user can configure the settings for the wireless connection between the computer and device more easily than ever.

Optionally, said displaying the input screen image may include displaying as one of the input screen images a setting device selecting screen image for selecting any one of the at least one device whose state is recognized in said recognizing the state of the at least one device as an intended device for which the wireless connection settings are to be configured. Optionally, said controlling whether to display the input screen image may include preventing displaying the setting device selecting screen image in said displaying the input screen image, in response to the at least one device being recognized to be only one in said recognizing the state of the at least one device. Optionally, said configuring the wireless connection settings may include: determining a device that is selected on the setting device selecting screen image as the intended device for which the wireless connection settings are to be configured, in response to the at least one device being recognized to be two or more in said recognizing the state of the at least one device; and determining a device as the intended device in response to the device being the only one device recognized in said recognizing the state of the at least one device.

By the instructions, included in the aforementioned computer program product, making the computer execute the wireless connection setting process, when the at least one device is recognized to be two or more, the user can select the intended device on the setting device selecting screen image. Meanwhile, when the at least one device is recognized to be only one, it is possible to prevent the user from purposely providing the input for selecting the intended device by set the only recognized device as the intended device.

Optionally, said recognizing the state of the at least one device may be intended for one or more predetermined types of devices. When the wireless connection setting process is executed by the computer according to the instructions included in the above computer program product, it is allowed to recognize only the predetermined type of devices. Thereby, it is possible to save trouble for purposely providing the input for selecting the predetermined type of device among the recognized devices, and to prevent a device other than the predetermined type of devices from being mistakenly selected as the intended device.

Optionally, the communication interface may be configured to wirelessly communicate. Optionally, the wireless connection settings may include recognizing wireless networks through the communication interface. In this case, said displaying the input screen image may include displaying as one of the input screen images a wireless network selecting screen image for selecting any one of the wireless networks recognized in said recognizing the wireless networks as an intended wireless network that the at least one device is to join. Optionally, said controlling whether to display the input screen image may include preventing displaying the wireless network selecting screen image in said displaying the input screen image, in response to the wireless networks being recognized to be only one in said recognizing the wireless networks. Optionally, said configuring the wireless connection settings may include: determining a wireless network selected on the wireless network selecting screen image as the intended wireless network that the at least one device is to join, in response to the wireless networks being recognized to be two or more in said recognizing the wireless networks; configuring the wireless connection settings that may be used for making the at least one device join the selected wireless network; determining a wireless network as the intended wireless network in response to the wireless network being recognized to be only one in said recognizing the wireless networks; and configuring the wireless connection settings that may be used for making the at least one device join the only one wireless network.

When the wireless connection setting process is executed by the computer according to the instructions included in the computer program product thus configured, the computer can recognize the wireless networks, and configure the settings that may be used for making the at least one device join one of the recognized wireless networks. Moreover, when the wireless networks are recognized to be two or more, the user can select the intended wireless network on the wireless network selecting screen image. Meanwhile, when the wireless networks are recognized to be only one, it is possible to prevent the user from purposely providing the input for selecting the intended wireless network by determining the recognized wireless network as the intended one.

Further optionally, the communication interface may be configured to wirelessly communicate. Optionally, the wireless connection settings may include recognizing wireless networks through the communication interface. In this case, said displaying the input screen image may include displaying as one of the input screen images a wireless network selecting screen image for selecting any one of the wireless networks recognized in said recognizing the wireless networks as an intended wireless network that the at least one device is to join. Optionally, said controlling whether to display the input screen image may include preventing displaying the wireless network selecting screen image in said displaying the input screen image, in response to the wireless networks recognized in said recognizing the wireless networks including a wireless network that the computer is joining. Optionally, said configuring the wireless connection settings may include: determining the wireless network selected on the wireless network selecting screen image as the intended wireless network that the at least one device is to join, in response to the wireless networks recognized in said recognizing the wireless networks not including the wireless network that the computer is joining; configuring the wireless connection settings that may be used for making the at least one device join the selected wireless network; determining the wireless network that the computer is joining as the intended wireless network in response to the wireless networks recognized in said recognizing the wireless networks including the wireless network that the computer is joining; and configuring the wireless connection settings that may be used for making the at least one device join the wireless network that the computer is joining.

By the instructions, included in the aforementioned computer program product, making the computer execute the wireless connection setting process, the computer can recognize the wireless networks, and configure the settings that may be used for making the at least one device join one of the recognized wireless networks. In addition, when the recognized wireless networks do not include the wireless network that the computer is joining, the user can select the intended wireless network on the wireless network selecting screen image. Meanwhile, when the recognized wireless networks include the wireless network that the computer is joining, it is possible to prevent the user from purposely providing the input for selecting the intended wireless network by determining the wireless network that the computer is joining as the intended wireless network. In particular, when the user wants to set up the device available from the computer, which has conventionally been used by the user, the program is so useful as to prevent the user from configuring wrong settings.

Furthermore, by thus setting the wireless connection setting process, the following effect can be expected. There is considered a case where a wireless network, which is not to be determined as the intended one that the device is to join, for example, as a wireless network located in a neighbor room (menage) in a complex housing, is recognized. However, when the recognized wireless networks include the wireless network that the computer is joining, since the wireless network that the computer is joining is already known to cause no trouble even in the case of making the device join it, the user can configure the settings that may be used for making the device join the wireless network more easily by determining the wireless network that the computer is joining as the intended wireless network. On the other hand, when the recognized wireless networks do not include the wireless network that the computer is joining, it is possible to prevent the user from determining the wireless network, which is not to be determined as the intended one, as the intended one by making the user confirm whether to determine each of the recognized wireless networks as the intended one.

Still optionally, the wireless connection settings may include recognizing whether a predetermined security function is set for the wireless network determined as the intended wireless network that the at least one device is to join in said configuring the wireless connection settings through the communication interface. In this case, preferably, said displaying the input screen image may include displaying a warning screen image for warning that the predetermined security function is not set for the wireless network determined as the intended wireless network in said recognizing whether a predetermined security function is set for the wireless network determined as the intended wireless network, in response to the predetermined security function being not judged to be set for the determined wireless network.

By the instructions, included in the computer program product thus configured, making the computer execute the wireless connection setting process, when the security function is not set for the determined wireless network, it is possible to warn the user about that situation. For this reason, the user can allow the device not to join the determined wireless network without knowing that the determined wireless network for which the security function is not set, but arbitrarily to join another wireless network for which the security function is set.

According to another aspect of the present invention, there is provided a computer program product including computer readable instructions that cause a computer to execute a wireless connection setting process, the computer being configured to create a wireless connection with devices located therearound, the wireless connection setting process being executed in response to the computer receiving an external setting request for creating the wireless connection with any one of the devices located around the computer, the wireless connection setting process including: recognizing the devices located around the computer through a wireless network; determining a device, which is recognized as only one device located around the computer in said recognizing the devices, as an intended device with which the computer is to create the wireless connection; and creating the wireless connection between the computer and the device determined in said determining the device.

By the instructions, included in the computer program product thus configured, making the computer execute the wireless connection setting process, when the computer receives the external setting request, the computer recognizes the devices located therearound through the wireless network. When the devices are recognized to be only one, the computer determines the recognized device as the intended device with which the computer is to create the wireless connection to create the wireless connection with the determined device.

In other words, in the computer that executes the wireless connection setting process, despite the only one device located around the computer, it is possible to prevent the user from purposely providing the input for selecting the intended device. Therefore, the user can configure the settings for the wireless connection between the computer and the device more easily than ever.

It is noted that in said recognizing the devices, any methods may be applied to recognize the devices located around the computer. For example, if the devices is configured to send a predetermined wireless signal every a predetermined time period, the device may be recognized based upon the wireless signal. Further, if the device is configured to respond to a response request from the computer, the computer may transmit the response request to recognize the device based upon the response from the device to the response request. By thus recognizing the device based upon the signal or the response therefrom, the user or a network administrator is not required to separately input information for recognizing the device to the computer. In addition, if the wireless connection setting process is configured to make the computer detect the signal or the response in said recognizing the devices after receiving the setting request, it will be allowed to recognize only the devices currently existing. Accordingly, it is possible to prevent the computer from wrongly determining device that does not currently exist as the intended device.

In said recognizing the devices, there is considered an undesired case where, for example, the computer recognizes a device that is not to be determined as the intended device with which the computer is to create the wireless connection, as a device located in a neighbor room (menage) in a complex housing.

In consideration of the above problem, optionally, said determining the device may include: judging whether a device, which is recognized as only one device located around the computer in said recognizing the devices, conforms to a predetermined device with which the computer is to create the wireless connection; re-determining the recognized device as the intended device with which the computer is to create the wireless connection, in response to the recognized device conforming to the predetermined device in said judging; displaying a judging screen image for judging whether to select the recognized device as the intended device with showing the recognized device thereon, in response to the recognized device not conforming to the predetermined device in said judging; and determining the recognized device as the intended device with which the computer is to create the wireless connection, only in response to the recognized device being selected on the judging screen image in said displaying the judging screen image.

By the instructions, included in the computer program product thus configured, making the computer execute the wireless connection setting process, when the recognized device conforms to the predetermined device with which the computer is to create the wireless connection, the recognized device is re-determined as the intended device. Thereby, the user can simply configure the settings for the wireless connection with the recognized device, i.e., the predetermined device that causes no problem even if it is determined as the intended device. Meanwhile, when the recognized device does not conform to the predetermined device, it is possible to prevent the computer from determining a device, which the computer is not to determine as the intended device, as the intended device, by making the user confirm whether the recognized device is to be determined as the intended device.

Optionally, said determining the device may include: displaying a selecting screen image for selecting any one of the recognized devices located around the computers as the intended device with which the computer is to create the wireless connection with showing the recognized devices located around the computers, in response to the devices located around the computer being recognized to be two or more in said recognizing the devices; and determining a device selected on the selecting screen image displayed in said displaying the selecting screen image as the intended device with which the computer is to create the wireless connection.

By the instructions, included in the computer program product thus configured, making the computer execute the wireless connection setting process, when there is located one or more devices around the computer, the user can select any one of the recognized devices as the intended device. That is, the computer program product can preferably be applied in such an environment that there is located one or more devices around the computer as an office where there is a user having a technical knowledge about the wireless connection.

Here, in the case where wireless access points are included in the devices, optionally, said determining the device may include determining a wireless access point externally specified as an intended wireless access point with which the computer is to create the wireless connection, in response to any wireless access points being not recognized.

By the instructions, included in the computer program product thus configured, making the computer execute the wireless connection setting process, when any wireless access points are set not to be recognized because of a security reason, the computer can configure the settings for the wireless connection with the specified wireless access point.

Further, in the case where wireless access points are included in the devices, preferably, the wireless connection setting process may include: confirming whether a security function is set for the wireless access point that is determined as the intended wireless access point with which the computer is to create the wireless connection in said determining the device; and displaying a warning screen image for warning that the security function is not set for the determined wireless access point, in response to the security function being confirmed not to be set for the determined wireless access point in said confirming.

By the instructions, included in the computer program product thus configured, making the computer execute the wireless connection setting process, when the security function is not set for the determined wireless access point, the computer can warn the user about that situation. This can prevent the user from making the device join the wireless network for which the security function is not set without knowing that situation, and can cause the device to arbitrarily join the wireless network with the security function.

Optionally, said recognizing the devices may be intended for one or more predetermined types of devices. By the instructions, included in the computer program product thus configured, making the computer execute the wireless connection setting process, it is allowed to recognize only the predetermined type of devices. Thereby, it is possible to save trouble for purposely providing the input for selecting the predetermined type of device among the recognized devices, and to prevent a device other than the predetermined type of devices from being mistakenly selected as the intended device.

Meanwhile, the aforementioned computer readable instructions included in the computer program products may be stored in a ROM or backup RAM that are incorporated in the computer, and may be used with being loaded from the ROM or the backup RAM to the computer. The instructions may be used with being loaded to the computer via the wireless network.

According to a further aspect of the present invention, there is provided a recording medium in which the aforementioned computer readable instructions are stored, the recording medium being configured such that the instructions stored therein can be read by the computer. Such a recording medium can cause the same effects as aforementioned.

More specifically, there is provided a recording medium, which includes a wireless connection setting program stored therein such that a computer including a communication interface configured to communicate with at least one device can read the wireless connection setting program. The wireless connection setting program is designed to be executed in response to the computer receiving an external setting request for configuring wireless connection settings that may be used for making the at least one device join a wireless network. The wireless connection setting program includes: recognizing a state of the at least one device through the communication interface; displaying an input screen image sequentially for each of at least one setting item, to be set, of the wireless connection settings, the input screen image being designed for receiving an input for each of the at least one setting item thereon; configuring the wireless connection settings for the at least one device based upon the input; and controlling whether to display the input screen image for each of the at least one setting item of the wireless connection settings in said displaying the input screen image, by judging whether the input is required to be received for each of the at least one setting item based upon the state of the at least one device that is recognized in said recognizing the state of the at least one device. Said configuring the wireless connection settings includes determining the setting item for which the input is not judged required to be received in said controlling whether to display the input screen image based upon the state of the at least one device recognized in said recognizing the state of the at least one device.

According to a further aspect of the present invention, there is provided a recording medium, which includes a wireless connection setting program stored therein such that a computer configured to create a wireless connection with devices located therearound can read the wireless connection setting program. The wireless connection setting program is designed to be executed in response to the computer receiving an external setting request for creating the wireless connection with any one of the devices located around the computer. The wireless connection setting program includes: recognizing the devices located around the computer through a wireless network; determining a device, which is recognized as only one device located around the computer in said recognizing the devices, as an intended device with which the computer is to create the wireless connection; and creating the wireless connection between the computer and the device determined in said determining the device.

As the aforementioned recording medium, there are cited, for example, a flexible disk (FD), Magneto-Optical disk (MO), DVD, BLU-RAY™ disk, HD-DVD, hard disk, and memory card.

According to a further aspect of the present invention, there is provided a computer in which at least one of the aforementioned computer program products is installed. Such a computer can cause the same effects as aforementioned.

More specifically, there is provided a computer configured to join a wireless network, comprising: a communication interface configured to communicate with at least one device; and a wireless connection setting program installed therein. The wireless connection setting program is designed to be executed in response to the computer receiving an external setting request for configuring wireless connection settings that may be used for making the at least one device join the wireless network. The wireless connection setting program includes: recognizing a state of the at least one device through the communication interface; displaying an input screen image sequentially for each of at least one setting item, to be set, of the wireless connection settings, the input screen image being designed for receiving an input for each of the at least one setting item thereon; configuring the wireless connection settings for the at least one device based upon the input; and controlling whether to display the input screen image for each of the at least one setting item of the wireless connection settings in said displaying the input screen image, by judging whether the input is required to be received for each of the at least one setting item based upon the state of the at least one device that is recognized in said recognizing the state of the at least one device. Said configuring the wireless connection settings includes determining the setting item for which the input is not judged required to be received in said controlling whether to display the input screen image based upon the state of the at least one device recognized in said recognizing the state of the at least one device.

According to a further aspect of the present invention, there is provided a computer configured to join a wireless network and create a wireless connection with devices located therearound, which includes a wireless connection setting program installed therein. The wireless connection setting program is designed to be executed in response to the computer receiving an external setting request for creating the wireless connection with any one of the devices located around the computer. The wireless connection setting program includes: recognizing the devices located around the computer through the wireless network; determining a device, which is recognized as only one device located around the computer in said recognizing the devices, as an intended device with which the computer is to create the wireless connection; and creating the wireless connection between the computer and the device determined in said determining the device.

According to a further aspect of the present invention, there is provided a wireless network, which includes at least one computer configured as the aforementioned computers and at least one device configured to create a wireless connection with the at least one computer. Such a computer can cause the same effects as aforementioned.

More specifically, there is provided a wireless network, which includes: at least one computer that includes a communication interface and a wireless connection setting program installed therein; and at least one device. The communication interface is configured to communicate with the at least one device. The wireless connection setting program is designed to be executed in response to the at least one computer receiving an external setting request for configuring wireless connection settings that may be used for making the at least one device join said wireless network. The wireless connection setting program includes: recognizing a state of the at least one device through the communication interface; displaying an input screen image sequentially for each of at least one setting item, to be set, of the wireless connection settings, the input screen image being designed for receiving an input for each of the at least one setting item thereon; configuring the wireless connection settings for the at least one device based upon the input; and controlling whether to display the input screen image for each of the at least one setting item of the wireless connection settings in said displaying the input screen image, by judging whether the input is required to be received for each of the at least one setting item based upon the state of the at least one device that is recognized in said recognizing the state of the at least one device. Said configuring the wireless connection settings includes determining the setting item for which the input is not judged required to be received in said controlling whether to display the input screen image based upon the state of the at least one device recognized in said recognizing the state of the at least one device.

According to a further aspect of the present invention, there is provided a wireless network, which includes: at least one computer including a wireless connection setting program installed therein; and at least one device configured to create a wireless connection with the at least one computer. The wireless connection setting program is designed to be executed in response to the at least one computer receiving an external setting request for creating the wireless connection with the at least one device. The wireless connection setting program includes: recognizing the at least one device through said wireless network; determining a device, which is recognized as only one device in said recognizing the at least one device, as an intended device with which the at least one computer is to create the wireless connection; and creating the wireless connection between the at least one computer and the device determined in said determining the device.

Illustrative Embodiments

Hereinafter, an illustrative embodiment according to the present invention will be explained with reference to the accompanying drawings. FIG. 1 schematically shows a configuration of a personal computer 1 according to the present invention. As shown in FIG. 1, a personal computer (PC) 1 is configured in the same manner as a generally known personal computer.

Namely, the PC 1 is configured with a main body 11 being connected with a display device 12, keyboard 13, mouse (not shown), etc. The main body 11 is provided with a CPU (Central Processing Unit) 111 that executes various processes, a ROM (Read Only Memory) 112 that stores a program for boot processing (BIOS) to be executed by the CPU 111 when booting the PC 1, a RAM (Random Access Memory) 113 that serves as a memory area when the CPU 111 executes the various processes, an HDD (Hard Disk Drive) 114 that stores an operating system and programs for the various processes to be executed by the CPU 111, a CD-ROM drive 115 that reads data stored in an externally inserted CD-ROM, an input I/F (interface) 116 through which input signals, issued from input devices such as a keyboard 13 and mouse connected with the main body 11, are inputted to the CPU 111, a video I/F (interface) 117 through which a display based upon a command issued from the CPU 111 is displayed on the display device 12 connected with the main body 11, and a wireless LAN adapter 118 that creates a wireless connection between the CPU 111 and an external device on the basis of predetermined wireless communication standards (IEEE 802.11 in this illustrative embodiment). The above constituent elements included in the main body 11 are interconnected via a signal bus 119.

Figure 2:
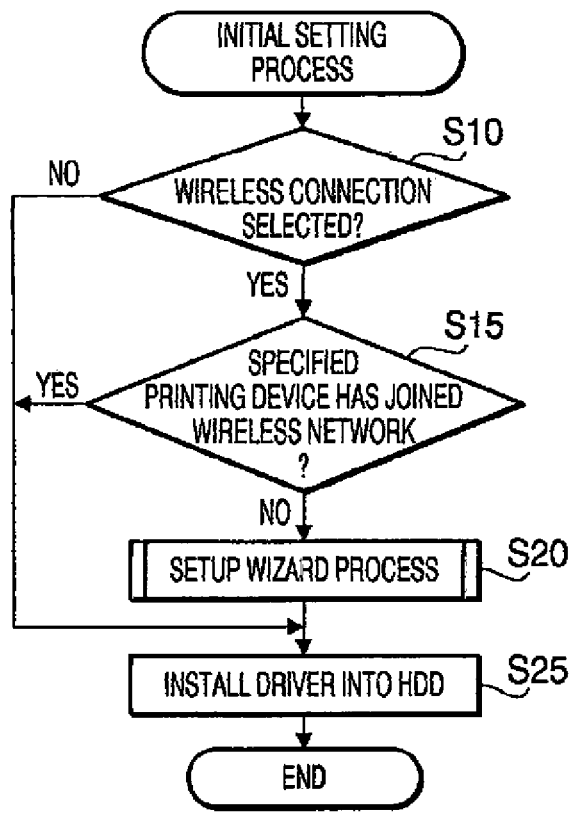
FIG. 2 is a flowchart showing a procedure of an initial setting process executed by a CPU in accordance with one or more aspects of the present invention.

Hereinafter, a process according to the present invention, among the various processes executed by the CPU 111, will be described in detail. FIG. 2 is a flowchart showing a procedure of an initial setting process executed by the CPU 111. It is noted that a program for executing this process is stored in the CD-ROM such that the CPU 111 can read the program, together with a driver as a program for controlling a specified type of printing device such as a printer and MFP (Multi Function Peripheral). When the CD-ROM is inserted into the CD-ROM drive 115, the CPU 111 begins to read data stored in the CD-ROM, displaying a menu screen image. Then, when an initial setting is selected on the menu screen image, the CPU 111 reads the program for this process, which is then executed.

As shown in FIG. 2, in this process, first, it is judged whether the wireless connection is selected as a connection method (S10). When any connection methods other than the wireless connection, i.e., a wired connection such as an Ethernet connection (trademark registration), a USB connection, and a parallel connection, are selected (S10: No), the process immediately goes to a step of S25 (described later).

Meanwhile, when the wireless connection is selected (S10: Yes), there is displayed a selection screen image for inquiring whether the specified printing device has already joined the wireless network that the PC 1 is joining (more specifically, whether the specified printing device has the wireless connection with a wireless access point with which the PC 1 has the wireless connection) (S15). Then, if a user makes choice of that the specified printing device has already joined the wireless network (S15: Yes), the process will immediately go to the below-mentioned S25.

On the other hand, if the user makes choice of that the specified printing device has not joined the wireless network (S15: No), after executing a setup wizard process S20 (described later), the driver will be installed into the HDD 114 (S25), so as to terminate the process.

Figure 3:
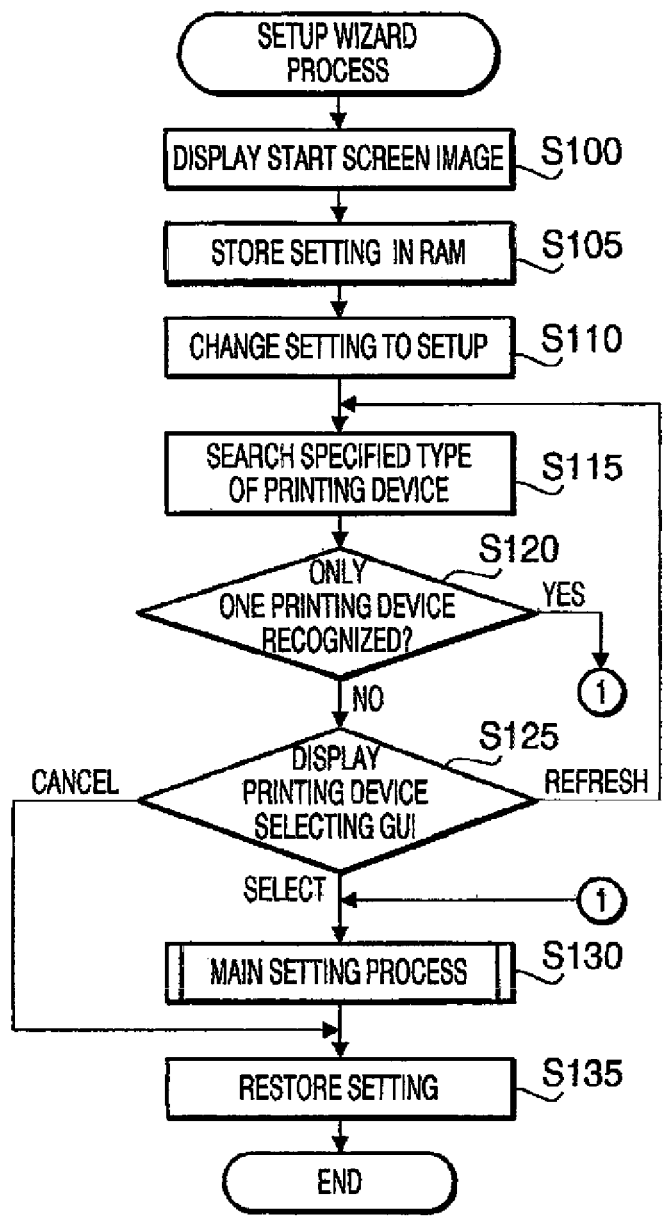
FIG. 3 is a flowchart showing a procedure of a setup wizard process in the initial setting process in accordance with one or more aspects of the present invention.

FIG. 3 is a flowchart showing a procedure of the setup wizard process (S20). As shown in FIG. 3, in this process, first, there is displayed on the display device 12 a start screen image (see FIG. 6) for indicating that the setup wizard process will be started (S100). Next, the CPU 111 makes the RAM 113 store a setting for the wireless LAN adapter 118 (in this case, a setting for the wireless connection with the wireless access point in the wireless network that the PC 1 is joining) (S105). In other words, the former setting for the wireless LAN adapter 118 is evacuated into the RAM 113. At the same time, the CPU 111 replaces the former setting for the wireless LAN adapter 118 with a setup that is a setting for creating the direct wireless connection with the external printing device (S110). Mentioning more specifically based upon the wireless LAN standards, the above "replace the former setting with the setup" means that an SSID for identifying the intended wireless network that the PC 1 is to join is changed to the same value as a value for configuring wireless connection settings that is assigned to the printing device for which the wireless connection settings have not yet been configured, so that the PC 1 can communicate with the printing device, for which the wireless connection settings with respect to a channel or an operation mode have not been configured, to configure the wireless connection settings. Thereby, the PC 1 is allowed to withdraw from the wireless network that the PC 1 has joined until the setup wizard starts, so as to communicate with the printing device.

Then, by transmitting a response request for requesting a response from the specified type of printing device, it is performed to search the specified type of printing devices located around the PC 1 (S115). Thereafter, it is judged whether the printing devices that respond to the response request are recognized to be only one (S120).

Figure 7:
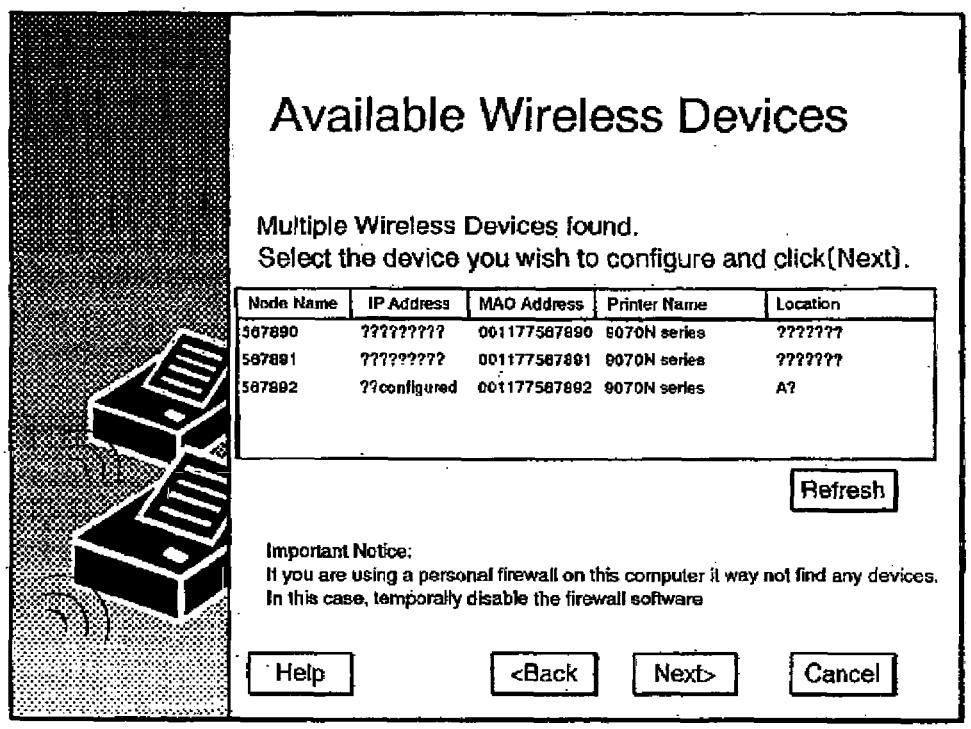
FIG. 7 is an illustration showing an example of a printing device selecting GUI displayed on the display device in accordance with one or more aspects of the present invention.

If the printing devices are recognized to be one (S120: Yes), the recognized printing device will be determined as an intended device for which the settings that may be used for joining the wireless network is to be configured. The process then goes to a step of S130 (described later). Meanwhile, if the printing devices are recognized to be two or more (S120: No), there will be displayed on the display device 12 a printing device selecting GUI (see FIG. 7) that is an input screen image for the user selecting a printing device to be allowed to join the wireless network (S125).

When "Cancel" is selected on the printing device selecting GUI (S125: Cancel), the process is immediately going to a step of S135 (described later). Meanwhile, when "Refresh" is selected on the printing device selecting GUI (S125: Refresh), the process is going back to the aforementioned S115 again.

On the other hand, when any of the recognized printing devices is selected (S125: Select), the selected printing device will be determined as the intended device for which the settings that may be used for joining the wireless network is to be configured, so as to execute the below-mentioned main setting process (S130). Thereafter, the setting for the LAN adapter 118 is restored to the former setting stored in RAM 113 in the aforementioned step of S105 (S135). Thereby, the PC 1 is allowed to re-join the wireless network that the PC 1 had joined before the setup wizard process started, and the process is terminated.

Figure 4:
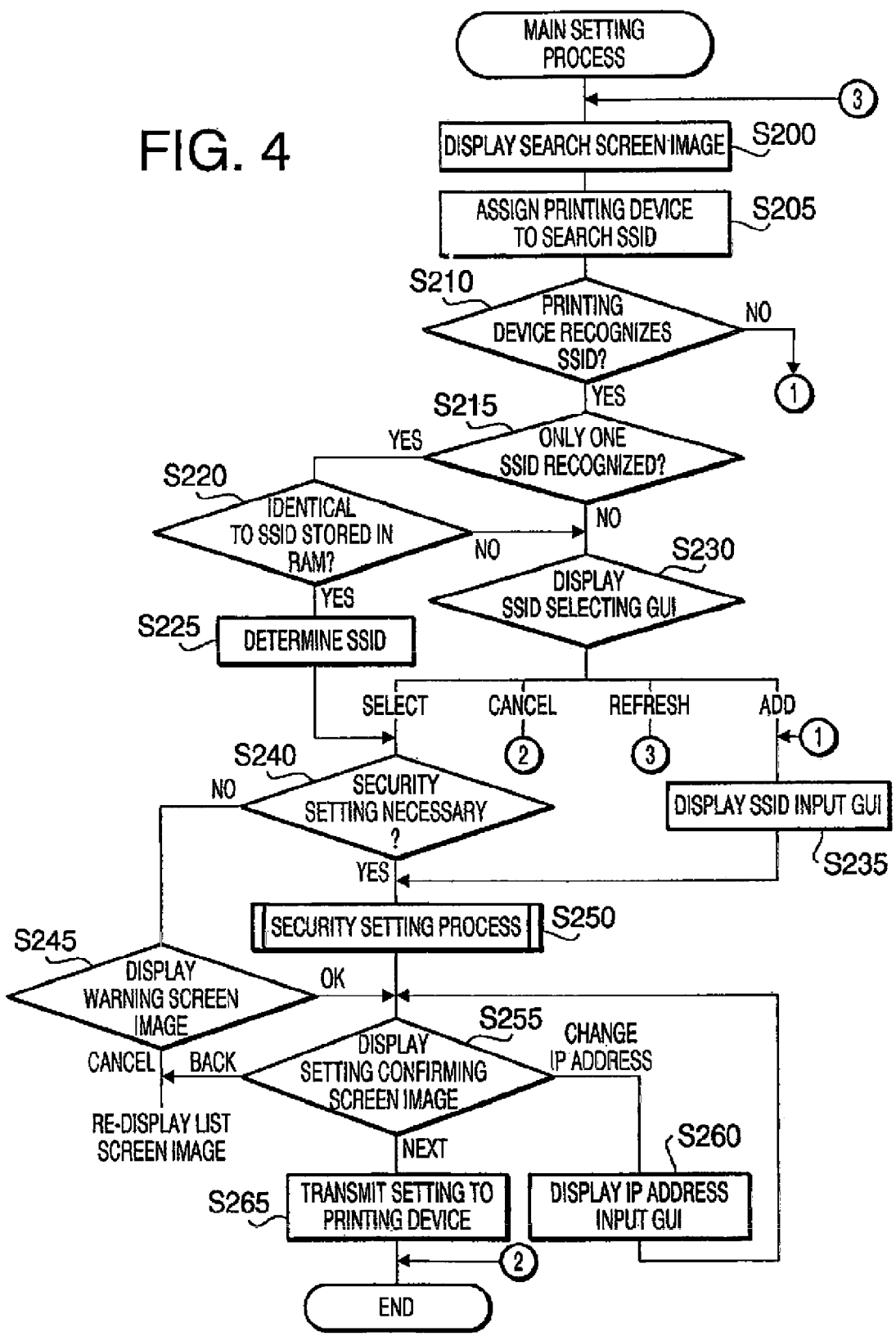
FIG. 4 is a flowchart showing a procedure of a main setting process in the setup wizard process in accordance with one or more aspects of the present invention.
Figure 8:
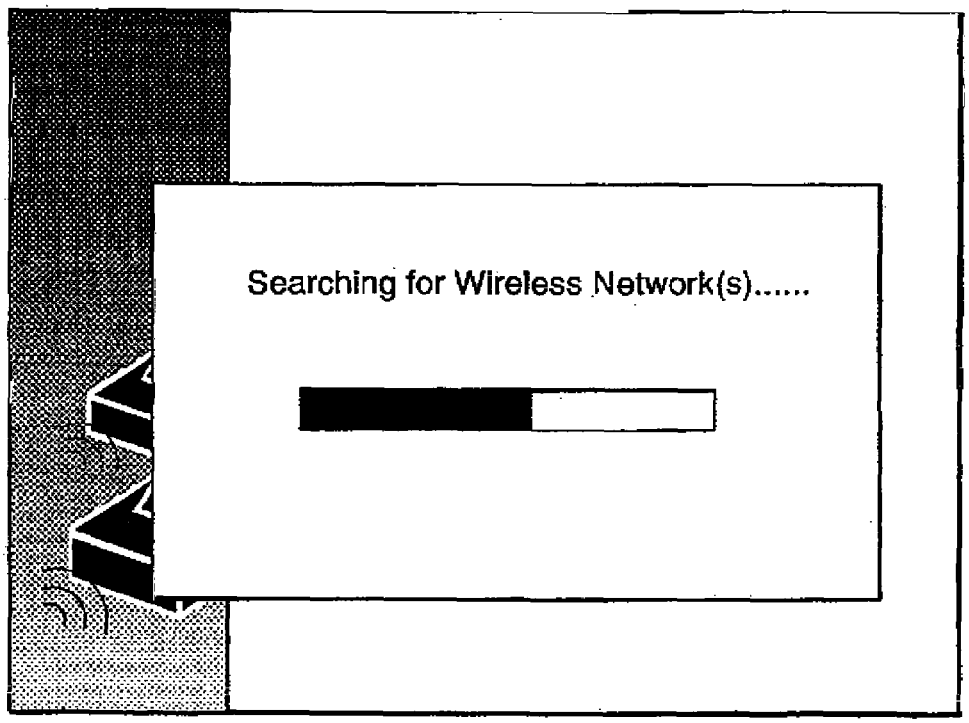
FIG. 8 is an illustration showing an example of a search screen image displayed on the display device in accordance with one or more aspects of the present invention.

Here, FIG. 4 is a flowchart showing a procedure of a main setting process (S130). As shown in FIG. 4, in this process, first, there is displayed a search screen image (see FIG. 8) indicating that the CPU 111 is currently searching the SSID of the wireless access point (S200). At the same time, the printing device is assigned to search the SSID (S205). It is noted that according to the above assignment, the printing device searches the SSID by receiving a beacon signal, which is transmitted from the wireless access point every a predetermined time period, including information such as the SSID, or by broadcasting a probe request for requesting the wireless access point to return a response signal (probe response) including the SSID and receiving the probe response to the probe request.

Then, it is judged whether the printing device recognizes the SSIDs (S210). If the printing device does not at all recognize the SSID for the reason that the printing device does not receive the beacon signal, or that the received beacon signal does not include the SSID because of a security function of the wireless access point (S210: No), the process will immediately go to a step of S235 (described later).

On the other hand, if the printing device is judged to recognize the SSIDs (S210: Yes), it will be judged whether the SSIDs are recognized to be only one (S215). If the SSIDs are recognized to be only one (S215: Yes), it will be judged whether the recognized SSID is identical to the SSID included in the setting stored in the RAM 113 (that is, whether the recognized SSID is identical to the SSID that the PC 1 had joined) (S220). If the recognized SSID is not identical to the SSID included in the setting stored in the RAM 113 (S220: No), the process will proceed to a step of S230 (described later). Meanwhile, if the recognized SSID is identical to the SSID included in the setting stored in the RAM 113 (S220: Yes), the SSID will be determined as an SSID of the intended wireless network which the printing device is to join (S225), and the process will proceed to a step of S240 (described later).

Figure 9:
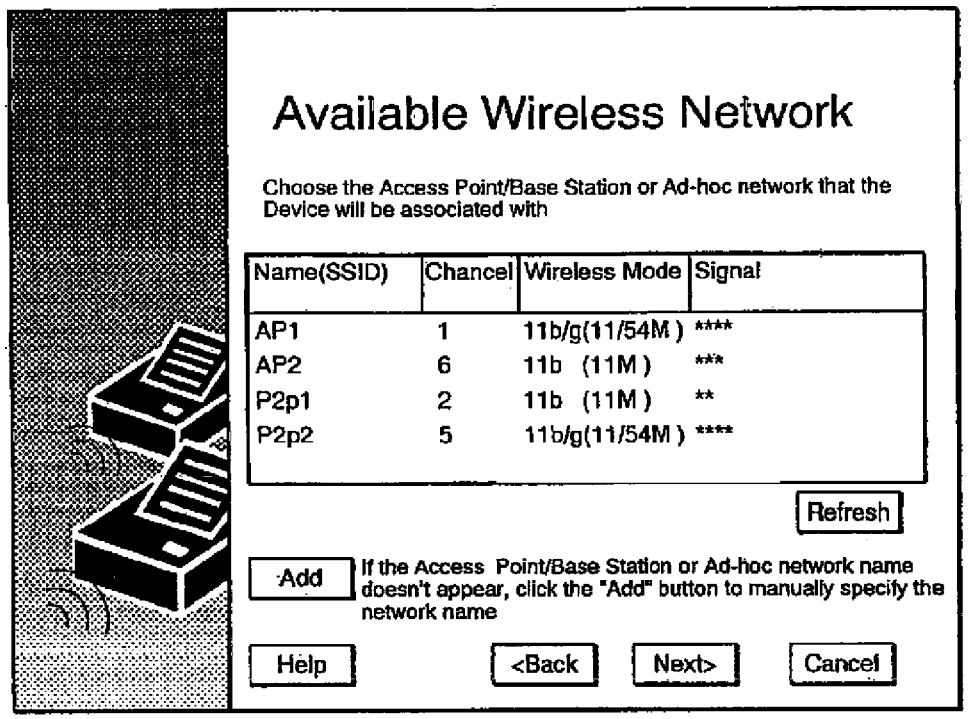
FIG. 9 is an illustration showing an example of an SSID selecting GUI displayed on the display device in accordance with one or more aspects of the present invention.

On the other hand, in the step of S215, if the SSIDs are recognized by the printing device to be two or more (S215: No), there will be displayed on the display device 12 an SSID selecting GUI (see FIG. 9) that is an input screen image for the user selecting the intended SSID which the printing device is to join among the recognized SSIDs (S230).

When "Cancel" is selected on the SSID selecting GUI (S230: Cancel), the process is immediately terminated to break the setup wizard.

Figure 10:
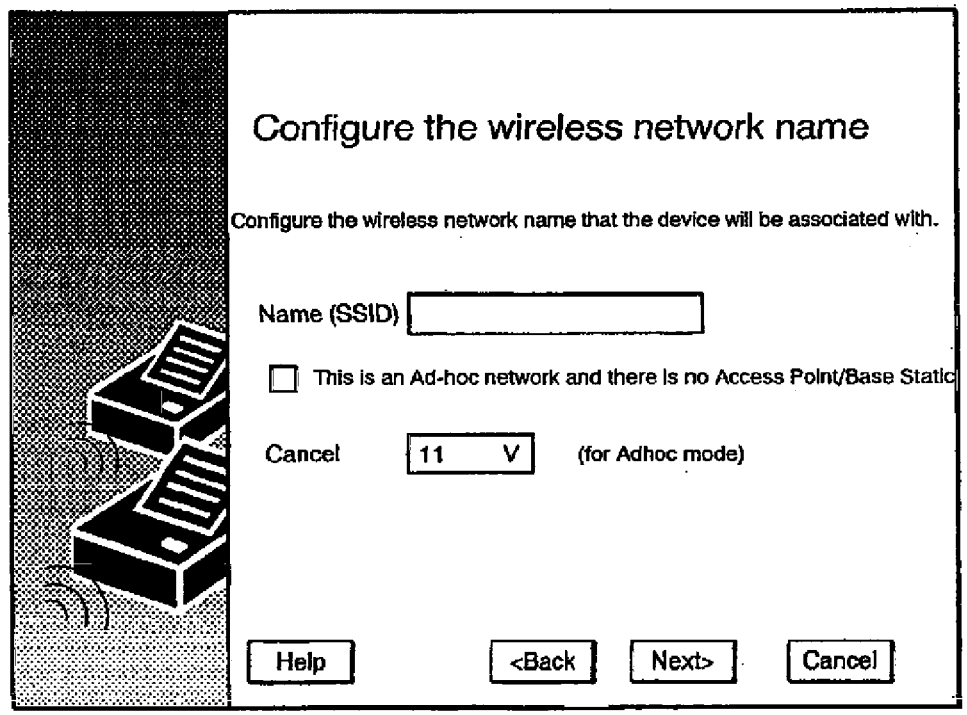
FIG. 10 is an illustration showing an example of an SSID input GUI displayed on the display device in accordance with one or more aspects of the present invention.
Figure 11:
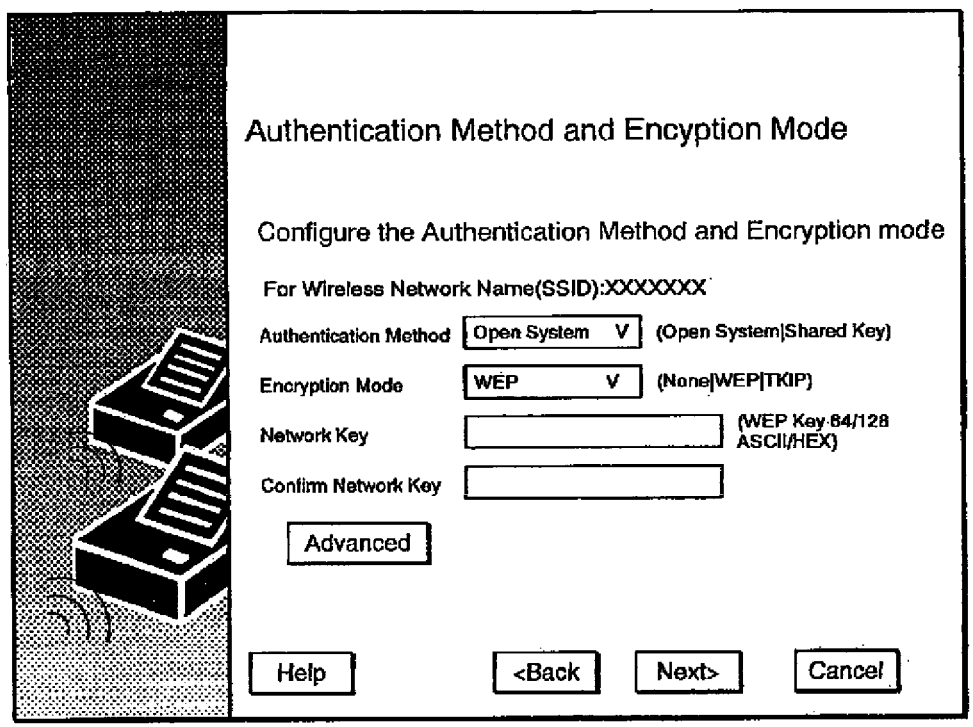
FIG. 11 is an illustration showing an example of a security setting GUI displayed on the display device in accordance with one or more aspects of the present invention.

Meanwhile, when "Refresh" is selected on the SSID selecting GUI (S230: Refresh), the process goes to the aforementioned S200 again. On the other hand, when "Add" is selected on the SSID selecting GUI (S230: Add), there is displayed on the display device 12 an SSID input GUI (see FIG. 10) that is an input screen image for the user adding the intended SSID which the printing device is to join (S235). The process then goes to a step of S250 (described below) after the user inputs the SSID.

When the SSID is selected on the SSID selecting GUI (S230: Select), the selected SSID is determined as an SSID of the intended wireless network that the printing device is to join. Then, it is judged whether a security setting is necessary for the printing device joining (being connected to) the determined wireless network, i.e., whether the security setting has already been set (S240). More specifically, based upon an identifier included in the beacon signal received by the printing device, it is judged whether the security setting is used for the printing device joining (being connected to) the determined wireless network.

Figure 14:
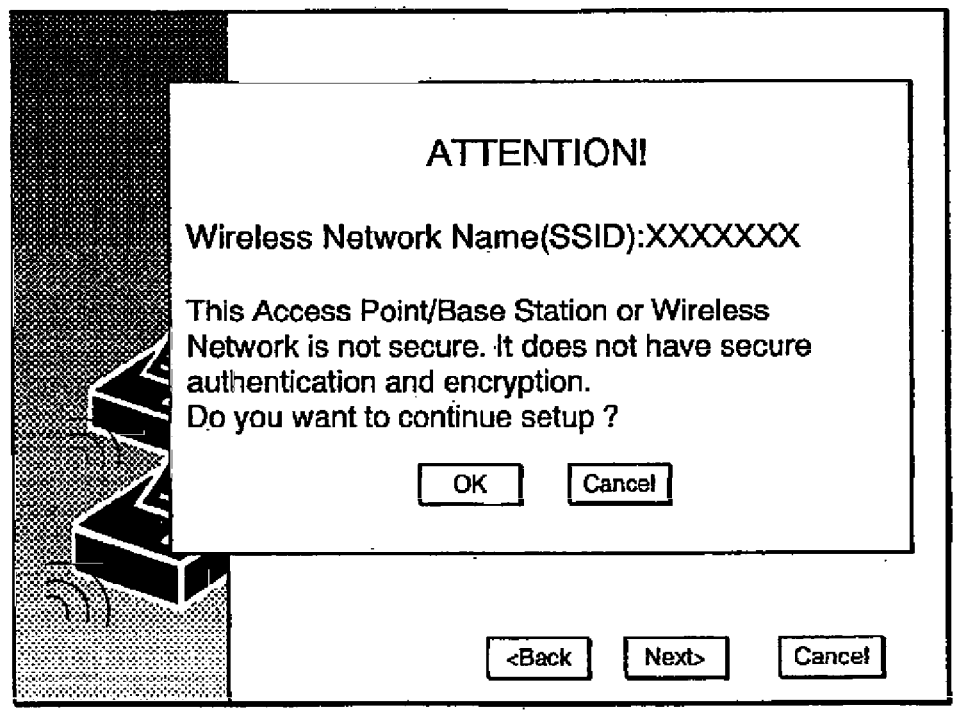
FIG. 14 is an illustration showing an example of a warning screen image displayed on the display device in accordance with one or more aspects of the present invention.

Here, when the security setting is not necessary (S240: No), there is displayed on the display device 12 a warning screen image (see FIG. 14) for warning about that the security setting is unnecessary (S245). When "Cancel" is selected on the warning screen image (S245: Cancel), the last screen image is re-displayed. Meanwhile, when "OK" is selected (S245: OK), the process proceeds to a step of S255 (described later).

Figure 15:
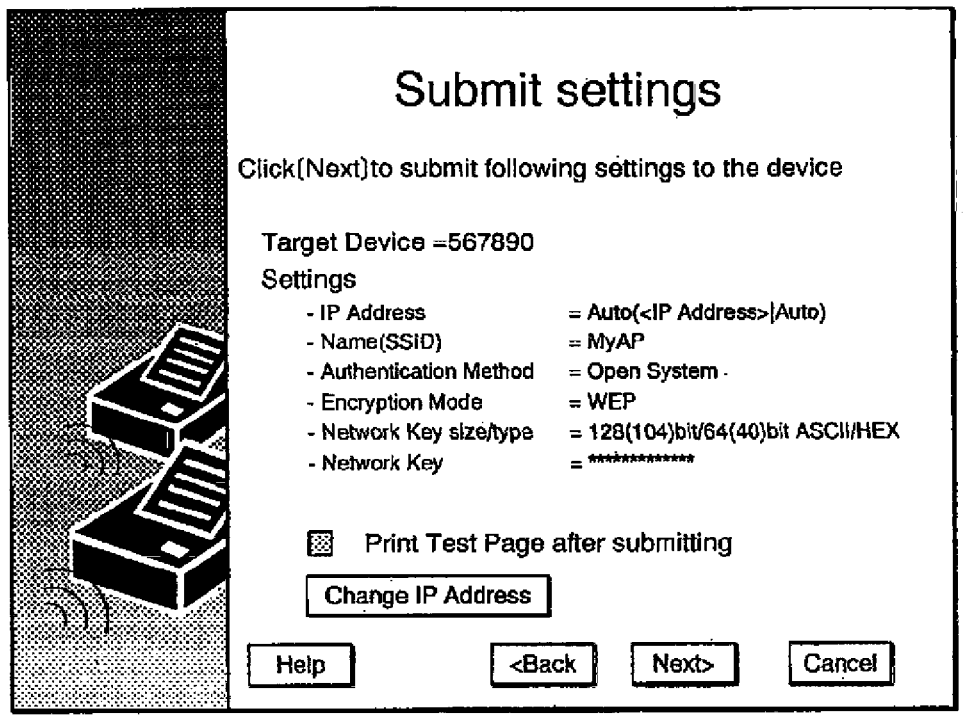
FIG. 15 is an illustration showing an example of a setting confirming screen image displayed on the display device in accordance with one or more aspects of the present invention.

On the other hand, in the step of S240, if the security setting is necessary (S240: Yes), a security setting process (described later) will be executed (S250), and then there will be displayed on the display device 12 a setting confirming screen image (see FIG. 15) for making the user confirm the setting (S255).

Figure 16:
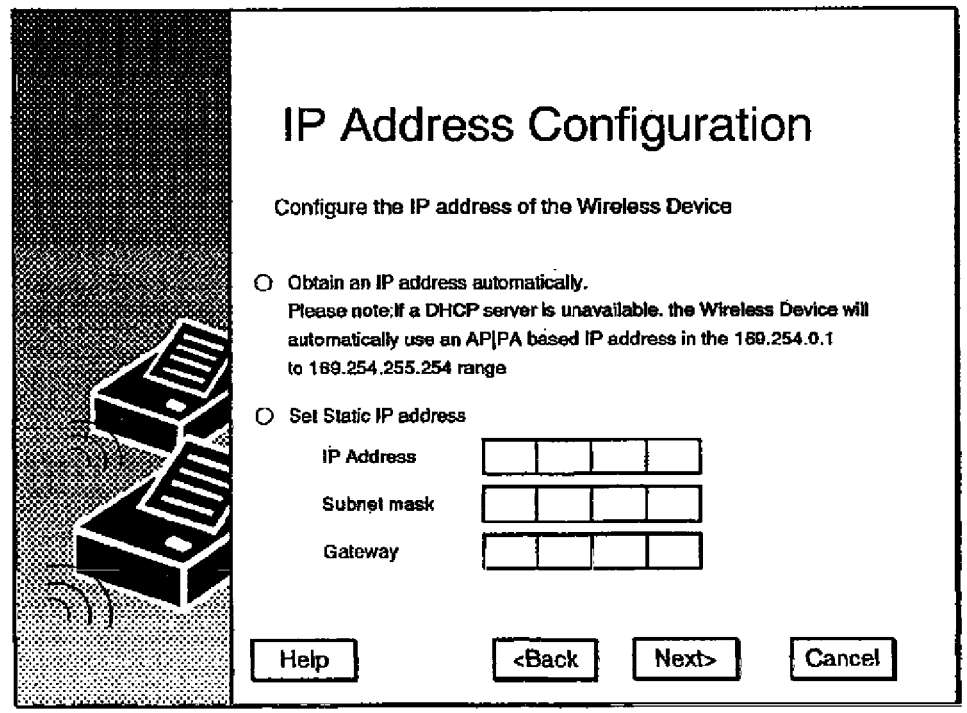
FIG. 16 is an illustration showing an example of an IP address input GUI displayed on the display device in accordance with one or more aspects of the present invention.

When "Back" is selected on the setting confirming screen image (S255: Back), the last screen image is displayed again. On the other hand, when "Change IP Address" is selected on the setting confirming screen image (S255: Change IP Address), there is displayed on the display device 12 an IP address input GUI (see FIG. 16) that is an input screen image for the user inputting the IP address (S260). Then, after the user inputs the IP address, the process goes to the aforementioned S255 again.

Meanwhile, when "Next" is selected on the setting confirming screen image (S255: Next), the settings such as the determined SSID and the setting in the security setting process are transmitted to the printing device (S265) to terminate this process.

FIG. 5 is a flowchart showing a procedure of the security setting process (S250). As shown in FIG. 5, in this process, first, there is displayed on the display device 12 a security setting GUI as an input screen image for the user setting security function (S300).

Then, when "Next" is selected after the user provides an input for each of various setting items on the security setting GUI (S300: Next), this process is immediately terminated.

Figure 12:
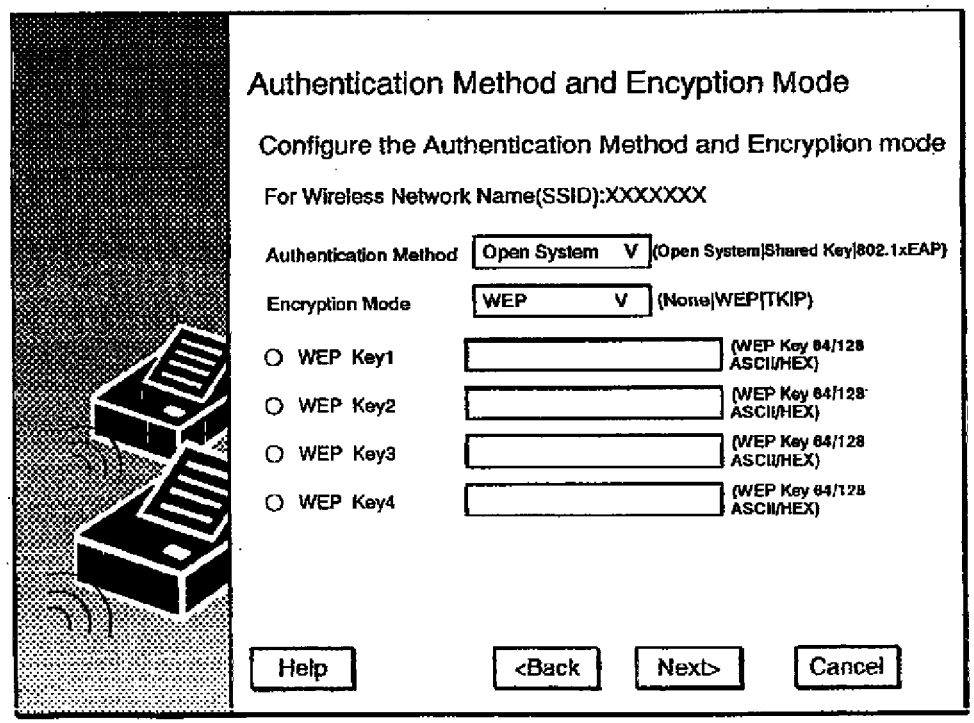
FIG. 12 is an illustration showing an example of a detail setting GUI displayed on the display device in accordance with one or more aspects of the present invention.

On the other hand, when "Advanced" is selected on the security setting GUI (S300: Advanced), there is displayed on the display device 12 a detail setting GUI (see FIG. 12) as an input screen image for the user inputting details on the security settings (S305).

Then, when "Back" is selected on the security setting GUI (S305: Back), the process goes back to the aforementioned S300 again. Meanwhile, when "Next" is selected after the details of the security settings are inputted on the detail setting GUI (S305: Next), it is judged whether a setting of an EAP (Extensible Authentication Protocol) is necessary (S310). More specifically, it is judged whether the EAP is selected as an Authentication Method on the detail setting GUI.

Figure 13:
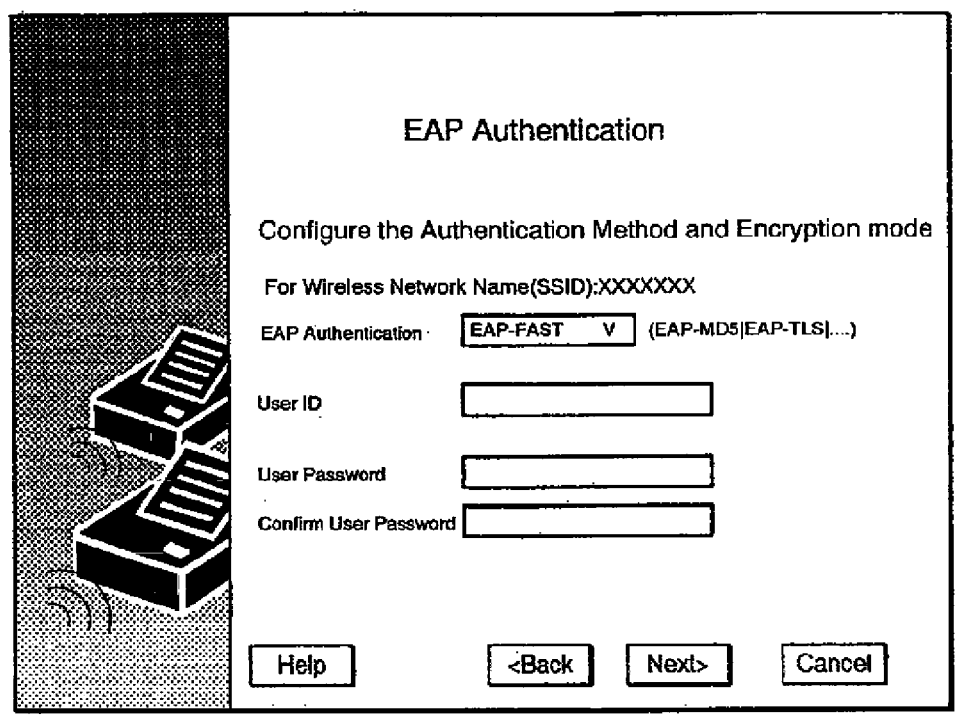
FIG. 13 is an illustration showing an example of an EAP setting GUI displayed on the display device in accordance with one or more aspects of the present invention.

When the setting of the EAP is not necessary (S310: No), the process is immediately terminated. On the other hand, when the setting of the EAP is necessary (S310: Yes), there is displayed on the display device 12 an EAP setting GUI (see FIG. 13) as an input screen image for the user setting the EAP (S315).

Then, when "Back" is selected on the EAP setting GUI (S315: Back), the process goes to the aforementioned S305 again. Meanwhile, when "Next" is selected after various settings are inputted (S315: Next), the process is terminated.

Figure 17:
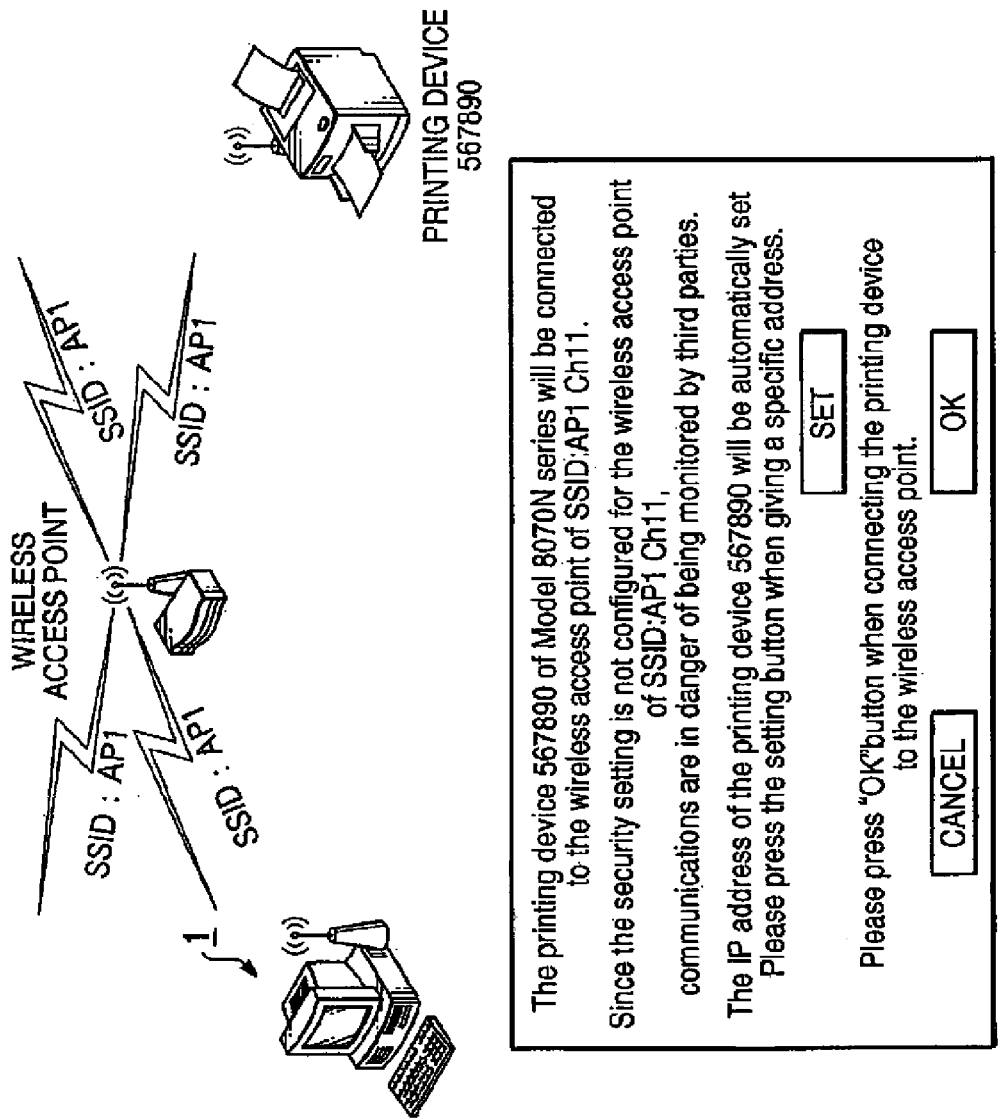
FIG. 17 is an illustration schematically showing an operation of the PC when there are only one printing device and one SSID in accordance with one or more aspects of the present invention.

By executing the above processes, in the PC 1 in this illustrative embodiment, for example, as shown in FIG. 17, when only one printing device is recognized in the case where the printing device is allowed to join the wireless network, it is judged that an input for selecting the printing device is unnecessary, so that a displaying operation for displaying the input screen image for selecting the printing device is skipped, and the recognized printing device is determined as the intended device for which the settings that may be used for joining the wireless network are to be configured. In addition, when only one SSID is recognized and the recognized SSID is identical to the SSID that the PC 1 had joined, it is judged that an input for selecting the SSID is unnecessary, so that a displaying operation for displaying the input screen image for selecting the SSID is skipped, and the recognized SSID is determined as the SSID of the intended wireless network that the printing device is to join. Then, an input screen image for confirming the settings for the printing device is displayed for the user.

In other words, in this illustrative embodiment, when there are located only one printing device and one wireless network around the PC 1, and the wireless network is identical to the wireless network that the PC 1 had joined, the PC 1 can prevent the user from providing an input for purposely selecting the wireless network and the printing device. Therefore, the user can configure the settings that may be used for making the printing device join the wireless network more easily than ever. For this reason, the PC 1 in this illustrative embodiment can be preferably applied in such an environment that there are one printing device and one wireless network as a general home.

In addition, by executing the aforementioned process, the PC 1 in this illustrative embodiment judges that an input for selecting the intended SSID that the printing device is to join is necessary, and displays the input screen image for selecting the SSID, so as to make the user select the SSID, when the recognized SSID is not identical to the SSID that the PC 1 had joined, even though the recognized SSID is only one.

That is to say, when the recognized wireless network is not identical to the wireless network that the PC 1 had joined, it is possible to prevent a wireless network, which is not to be set as an intended one that the printing device is to join, from being set as the intended one, by making the user confirm whether the recognized wireless network is to be set as the intended one. Thereby, even when a wireless network, which is not to be set as the intended one that the printing device is to join, for example, as a wireless network located in a neighbor room (ménage) in a complex housing, is recognized, it is possible to prevent the recognized wireless network from being set as the intended one.

Figure 18:
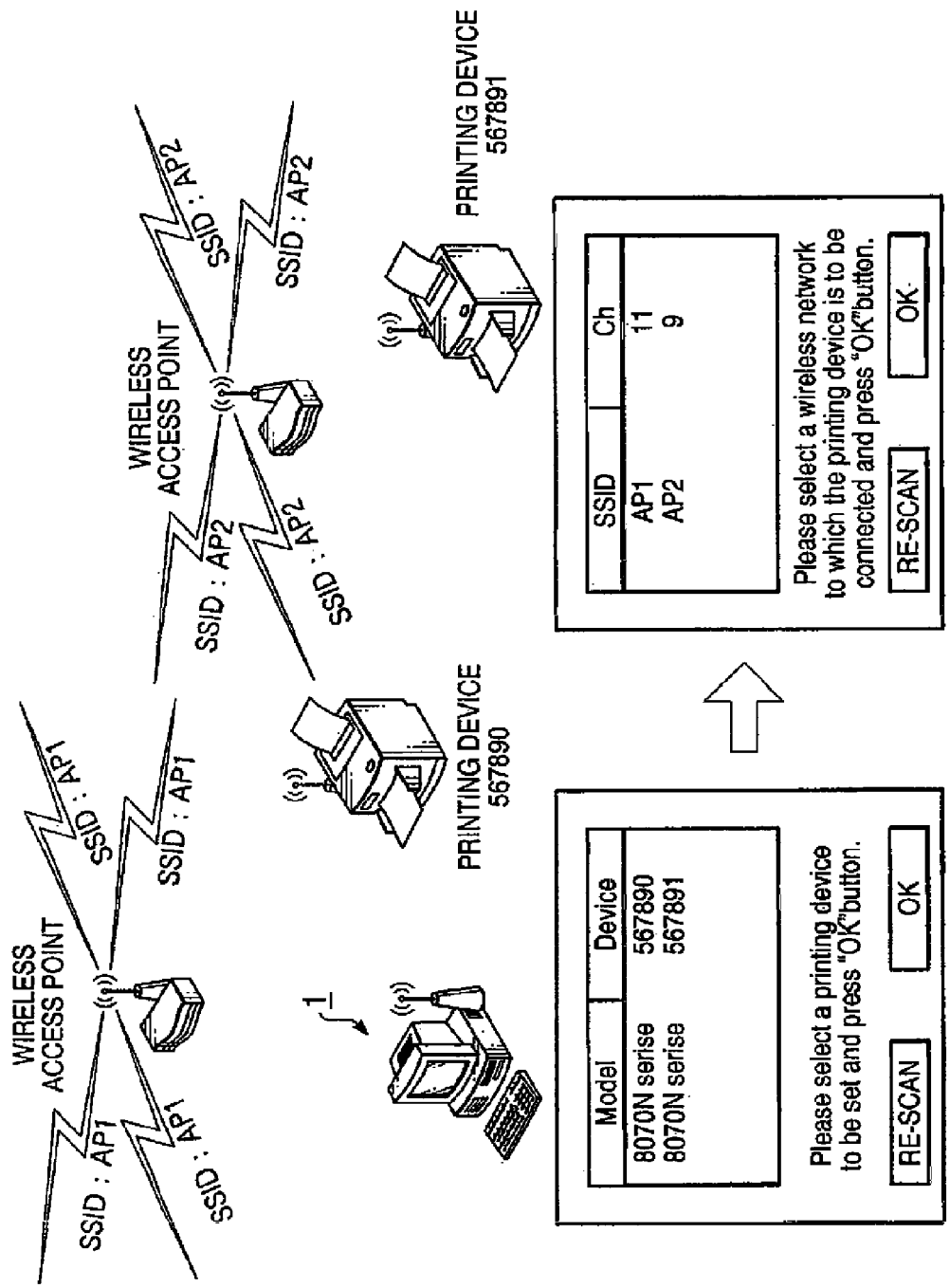
FIG. 18 is an illustration schematically showing an operation of the PC when there are one or more printing devices and one or more SSIDs in accordance with one or more aspects of the present invention.
Figure 19:
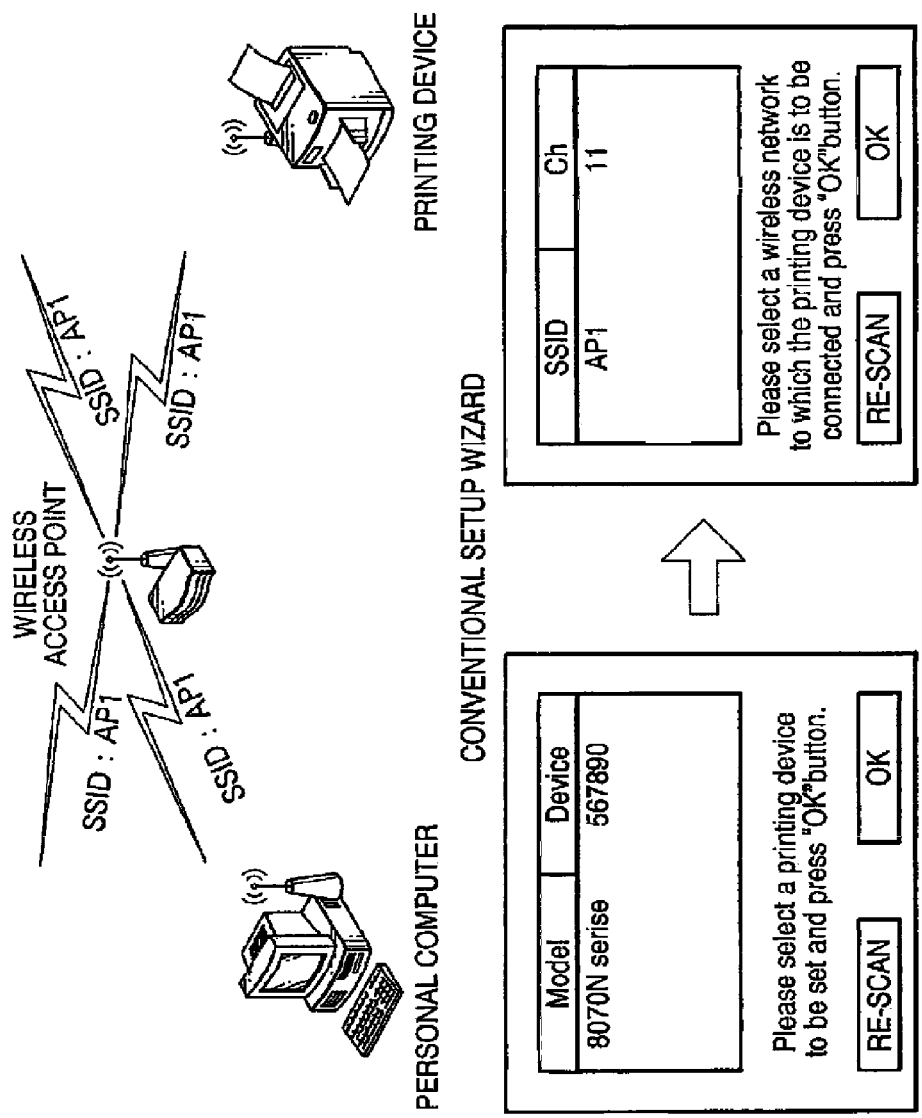
FIG. 19 is an illustration showing an example of problems described in the related art.

Further, by executing the above process, when the PC 1 recognizes one or more printing devices in the case of making a printing device join the wireless network, as shown in FIG. 18, the PC 1 in this illustrative embodiment judges that the input for selecting the intended printing device, for which the settings that may be used for joining the wireless network is to be configured, is necessary, and displays the input screen image for selecting the printing device, so as to make the user select the printing device. Moreover, when one or more SSIDs is recognized, the PC 1 judges that the input for selecting the intended SSID that the printing device is to join is necessary, and displays the input screen image for selecting the SSID to make the user select the SSID.

Namely, in the PC 1 in the illustrative embodiment, when one or more printing devices or wireless networks is recognized, the user can select a printing device or wireless network among the recognized printing devices or wireless networks. Thus, the PC 1 in the illustrative embodiment can be preferably applied in such an environment that there is one or more printing devices or one or more wireless networks on the periphery of the PC 1, as an office where there is a user with technical knowledge about the wireless network.

In addition, by executing the aforementioned process, when the recognized SSID is identical to the previously specified SSID, since the PC 1 in the illustrative embodiment determines the recognized SSID as an intended one that the printing device is to join, it is possible to simply configure the settings for the wireless network, which the PC 1 had joined and is known to cause no problem even if it is determined as an intended one that the printing device is to join. In particular, when the user wants to set up the printing device available from the PC 1, which has conventionally been used by the user, the PC 1 in the illustrative embodiment is so useful as to prevent the user from configuring wrong settings.

Further, by executing the above process, in the PC 1 in the illustrative embodiment, since only the specified type of printing devices can be determined as the intended one to be recognized, the user can save his trouble for providing the input for purposely selecting the specified type of printing device, and also it is possible to prevent the user from making such a mistake as to select a printing device other than the specified type of printing devices as the intended one to be connected to the wireless network.

In addition, by executing the above process, in the PC 1 in the illustrative embodiment, when the SSID cannot be recognized because of the security function, it is possible to display the input screen image for inputting the SSID, and to make the user input the SSID to allow the printing device to join the unrecognized wireless network.

Moreover, by executing the above-mentioned process, in the PC 1 in the illustrative embodiment, since the warning screen image is displayed when the security function cannot be set for the wireless network, it is possible to warn the user about that situation. For this reason, the user can allow the printing device not to join the wireless network for which the security function cannot be set without knowing that situation, but arbitrarily to join another wireless network for which the security function can be set.

Hereinabove, the illustrative embodiment according to the present invention has been explained. However, the present invention is not limited to the aforementioned illustrative embodiment, and it is needless to say that various sorts of modifications may be possible as far as they are within such a scope as not to extend beyond the essential teachings of the present invention.

For example, in the aforementioned embodiment, the program is stored in the CD-ROM, yet the program may be stored in any other recording medium such as a flexible disk (FD), Magneto-Optical disk (MO), DVD, BLU-RAY™ disk, HD-DVD, hard disk, and memory card.

Further, in the above embodiment, the present invention is applied when making the printing device join the wireless network, yet the present invention may be applicable when making any other device (such as a scanner, facsimile machine, camera (especially, digital camera), network storage, projector, MFP with one or more functions among the above-mentioned device functions, and MFP with the printer function and at least one of the above functions) join the wireless network.

What is claimed is:

1. A non-transitory computer readable recording medium, storing a computer-readable wireless connection setting program such that a computer, including a communication interface configured to communicate with at least one device, is configured to execute the wireless connection setting program, the wireless connection setting program being designed to be executed in response to the computer receiving an external setting request for setting, for the at least one device, setting values of wireless connection settings to enable the at least one device to join a wireless network via a wireless access point, the computer configured to start the wireless connection setting program in a state where the computer is joining a specific wireless network via a specific wireless access point identified by an SSID set for the computer, the wireless connection setting program comprising:

displaying an input screen image of a plurality of input screens, each designed for receiving an input for setting, for the at least one device, a setting value of at least one setting item of the wireless connection settings;

in response to receiving the input for setting, for the at least one device, the setting value of the at least one setting item corresponding to the displayed input screen image, setting, for the at least one device, a setting value of a setting item, corresponding to the received input, of the wireless connection settings for the at least one device; and executing an SSID setting process when setting, for the at least one device, a setting value of an SSID setting item of the wireless connections settings, the SSID setting item identifying a wireless access point for the at least one device to join the wireless network, the SSID setting process comprising:

transmitting an SSID detecting instruction to the at least one device via the communication interface of the computer, the SSID detecting instruction instructing the at least one device to detect each SSID of one or more wireless access points located around the at least one device by receiving a wireless signal via a wireless network interface of the at least one device;

receiving, from the at least one device, at least one SSID detected by the at least one device in response to the SSID detecting instruction;

determining whether the at least one SSID received from the at least one device is a single SSID, and whether the received single SSID is the SSID that identifies the specific wireless access point via which the computer was joining the specific wireless network when the computer received the external setting request;

in response to determining that the at least one SSID received from the at least one device is a single SSID and that the received single SSID is the SSID that identifies the specific wireless access point, setting the SSID that identifies the specific wireless access point as a setting value of the SSID setting item without displaying an SSID input screen image of the plurality of input screens, the SSID input screen image designed for receiving an input for setting, for the at least one device, the setting value of the SSID setting item;

in response to determining that the at least one SSID received from the at least one device is two or more SSIDs, or determining that the at least one SSID received from the at least one device is a single SSID and that the received single SSID is not the SSID that identifies the specific wireless access point, displaying the SSID input screen image; and when displaying the SSID input screen image, setting an SSID identified by an input received on the SSID input screen image, as the setting value of the SSID setting item.

2. The non-transitory computer readable recording medium according to claim 1, wherein said displaying the input screen image includes displaying as one of the input screen images a setting device selecting screen image for selecting any one of the at least one device whose state is recognized as an intended device for which the wireless connection settings are to be configured, and further comprising controlling whether to display another input screen image by preventing displaying the setting device selecting screen image in said displaying the input screen image where the at least one device is recognized to be only one, and wherein said setting a setting value of the setting item includes one of:

determining a device that is selected on the setting device selecting screen image as the intended device for which the wireless connection settings are to be configured, in response to the at least one device being two or more; and determining a device as the intended device in response to the device being the only one device.

3. The non-transitory computer readable recording medium according to claim 1, wherein the communication interface is configured to wirelessly communicate, wherein the wireless connection settings include recognizing wireless networks through the communication interface, wherein said displaying the input screen image includes displaying as one of the input screen images a wireless network selecting screen image for selecting any one of the wireless networks as an intended wireless network that the at least one device is to join, further comprising controlling whether to display another input screen image by preventing displaying the wireless network selecting screen image in said displaying the input screen image where the wireless networks is recognized to be only one, and wherein said setting a setting value of the setting item includes:

determining a wireless network selected on the wireless network selecting screen image as the intended wireless network that the at least one device is to join, in response to the wireless networks being two or more;

configuring the wireless connection settings that may be used for making the at least one device join the selected wireless network;

determining a wireless network as the intended wireless network in response to the wireless network being only one; and configuring the wireless connection settings that may be used for making the at least one device join the only one wireless network.

4. The non-transitory computer readable recording medium according to claim 3, wherein the wireless connection settings include recognizing whether a predetermined security function is set for the wireless network determined as the intended wireless network that the at least one device is to join in said configuring the wireless connection settings through the communication interface, and wherein said displaying the input screen image includes displaying a warning screen image for warning that the predetermined security function is not set for the wireless network determined as the intended wireless network in said recognizing whether a predetermined security function is set for the wireless network determined as the intended wireless network, in response to the predetermined security function being not judged to be set for the determined wireless network.

5. The non-transitory computer readable recording medium according to claim 1,
wherein the communication interface is configured to wirelessly communicate,
wherein the wireless connection settings include recognizing wireless networks through the communication interface,
wherein said displaying the input screen image includes displaying as one of the input screen images a wireless network selecting screen image for selecting any one of the wireless networks as an intended wireless network that the at least one device is to join,
further comprising controlling whether to display another input screen image by preventing displaying the wireless network selecting screen image in said displaying the input screen image, in response to the wireless networks recognized including a wireless network that the computer is joining, and
wherein said setting a setting value of the setting item includes:
  determining the wireless network selected on the wireless network selecting screen image as the intended wireless network that the at least one device is to join, in response to the wireless networks recognized in said recognizing the wireless networks not including the wireless network that the computer is joining;
  configuring the wireless connection settings that may be used for making the at least one device join the selected wireless network;
  determining the wireless network that the computer is joining as the intended wireless network in response to the wireless networks recognized in said recognizing the wireless networks including the wireless network that the computer is joining; and
  configuring the wireless connection settings that may be used for making the at least one device join the wireless network that the computer is joining.

6. The non-transitory computer readable recording medium according to claim 1, wherein the wireless connection setting program further comprises:
  storing the SSID set for the computer into a computer-accessible storage device in the state where the computer is joining the specific wireless network via the specific wireless access point through the communication interface, during a time period between a time when the computer has received the external setting request and a time to start the SSID setting process; and
  after storing the SSID set for the computer into the computer-accessible storage device, changing the SSID set for the computer to an SSID that enables the computer to connect with the at least one device, so as to connect the computer with the at least one device via the communication interface, and
wherein the SSID setting program is configured to, in said determining, perform:
  when the at least one SSID received from the at least one device is a single SSID identical to the SSID stored in the computer-accessible storage device, determining that the at least one SSID received from the at least one device is a single SSID and that the received single SSID is the SSID that identifies the specific wireless access point; and
  when the at least one SSID received from the at least one device is a single SSID not identical to the SSID stored in the computer-accessible storage device, determining that the at least one SSID received from the at least one device is a single SSID and that the received single SSID is not the SSID that identifies the specific wireless access point.

7. The non-transitory computer readable medium according to claim 1, wherein the wireless connection setting program further comprises:
  setting, for the computer, the SSID stored in the computer-accessible storage device so as to allow the computer to communicate with the at least one device via the specific wireless network, after setting, for the at least one device, the SSID that identifies the specific wireless access point via which the computer was joining the specific wireless network when the computer received the external setting request, as the setting value of the SSID setting item during execution of the SSID setting process.

8. A computer configured to join a wireless network via a wireless access point, the computer configured to start the wireless connection setting program in a state where the computer is joining a specific wireless network via a specific wireless access point identified by an SSID set for the computer, comprising:
  a communication interface configured to communicate with at least one device;
  a storage in which a wireless connection setting program is stored therein; and
  a processor configured to execute the wireless connection setting program in response to the computer receiving an external setting request for configuring wireless connection settings to enable the at least one device to join the wireless network, the execution of the wireless connection setting program controlling the computer to:
  display an input screen image of a plurality of input screens, each designed for receiving an input for setting, for the at least one device, a setting value of at least one setting item of the wireless connection settings;
  in response to receiving the input for setting, for the at least one device, the setting value of the at least one setting item corresponding to the displayed input screen image, setting, for the at least one device, a setting value of a setting item, corresponding to the received input, of the wireless connection settings for the at least one device; and
  executing an SSID setting process when setting, for the at least one device, a setting value of an SSID setting item of the wireless connections settings, the SSID setting item identifying a wireless access point for the at least one device to join the wireless network, the SSID setting process comprising:
    transmitting an SSID detecting instruction to the at least one device via the communication interface of the computer, the SSID detecting instruction instructing the at least one device to detect each SSID of one or more wireless access points located around the at least one device by receiving a wireless signal via a wireless network interface of the at least one device;
    receiving, from the at least one device, at least one SSID detected by the at least one device in response to the SSID detecting instruction;
    determining whether the at least one SSID received from the at least one device is a single SSID, and whether the received single SSID is the SSID that identifies the specific wireless access point via which the computer was joining the specific wireless network when the computer received the external setting request;

in response to determining that the at least one SSID received from the at least one device is a single SSID and that the received single SSID is the SSID that identifies the specific wireless access point, setting the SSID that identifies the specific wireless access point as a setting value of the SSID setting item without displaying an SSID input screen image of the plurality of input screens, the SSID input screen image designed for receiving an input for setting, for the at least one device, the setting value of the SSID setting item;

in response to determining that the at least one SSID received from the at least one device is two or more SSIDs, or determining that the at least one SSID received from the at least one device is a single SSID and that the received single SSID is not the SSID that identifies the specific wireless access point, displaying the SSID input screen image; and when displaying the SSID input screen image, setting an SSID identified by an input received on the SSID input screen image, as the setting value of the SSID setting item.

9. The computer according to claim 8, wherein said displaying the input screen image includes displaying as one of the input screen images a setting device selecting screen image for selecting any one of the at least one device whose state is recognized as an intended device for which the wireless connection settings are to be configured, further comprising controlling whether to display another input screen image by preventing displaying the setting device selecting screen image in said displaying the input screen image, in response to the at least one device being only one, and wherein said setting a setting value of the setting item includes one of:
  determining a device that is selected on the setting device selecting screen image as the intended device for which the wireless connection settings are to be configured, in response to the at least one device being two or more; and
  determining a device as the intended device in response to the device being the only one device.

10. The computer according to claim 8, wherein the communication interface is configured to wirelessly communicate, wherein the wireless connection settings include recognizing wireless networks through the communication interface, wherein said displaying the input screen image includes displaying as one of the input screen images a wireless network selecting screen image for selecting any one of the wireless networks as an intended wireless network that the at least one device is to join, further comprising controlling whether to display another input screen image by preventing displaying the wireless network selecting screen image in said displaying the input screen image where the wireless networks is recognized to be only one, and wherein said setting a setting value of the setting item includes:
  determining a wireless network selected on the wireless network selecting screen image as the intended wireless network that the at least one device is to join, in response to the wireless networks being two or more;
  configuring the wireless connection settings that may be used for making the at least one device join the selected wireless network;
  determining a wireless network as the intended wireless network in response to the wireless network being only one; and
  configuring the wireless connection settings that may be used for making the at least one device join the only one wireless network.

11. The computer according to claim 10, wherein the wireless connection settings includes recognizing whether a predetermined security function is set for the wireless network determined as the intended wireless network that the at least one device is to join in said configuring the wireless connection settings through the communication interface, and wherein said displaying the input screen image includes displaying a warning screen image for warning that the predetermined security function is not set for the wireless network determined as the intended wireless network in said recognizing whether a predetermined security function is set for the wireless network determined as the intended wireless network, in response to the predetermined security function being not judged to be set for the determined wireless network.

12. The computer according to claim 8, wherein the communication interface is configured to wirelessly communicate, wherein the wireless connection settings include recognizing wireless networks through the communication interface, wherein said displaying the input screen image includes displaying as one of the input screen images a wireless network selecting screen image for selecting any one of the wireless networks as an intended wireless network that the at least one device is to join, further comprising controlling whether to display another input screen image by preventing displaying the wireless network selecting screen image in said displaying the input screen image, in response to the wireless networks recognized including a wireless network that the computer is joining, and wherein said setting a setting value of the setting item includes:
  determining the wireless network selected on the wireless network selecting screen image as the intended wireless network that the at least one device is to join, in response to the wireless networks recognized in said recognizing the wireless networks not including the wireless network that the computer is joining;
  configuring the wireless connection settings that may be used for making the at least one device join the selected wireless network;
  determining the wireless network that the computer is joining as the intended wireless network in response to the wireless networks recognized in said recognizing the wireless networks including the wireless network that the computer is joining; and
  configuring the wireless connection settings that may be used for making the at least one device join the wireless network that the computer is joining.

13. The computer according to claim 8, wherein the wireless connection setting program further comprises:
  storing the SSID set for the computer into a computer-accessible storage device in the state where the computer is joining the specific wireless network via the specific wireless access point through the communication interface, during a time period between a time when the computer has received the external setting request and a time to start the SSID setting process; and after storing the SSID set for the computer into the computer-accessible storage device, changing the SSID set for the computer to an SSID that enables the computer to connect with the at least one device, so as to connect the computer with the at least one device via the communication interface, and wherein the SSID setting program is configured to, in said determining, perform:

when the at least one SSID received from the at least one device is a single SSID identical to the SSID stored in the computer-accessible storage device, determining that the at least one SSID received from the at least one device is a single SSID and that the received single SSID is the SSID that identifies the specific wireless access point; and when the at least one SSID received from the at least one device is a single SSID not identical to the SSID stored in the computer-accessible storage device, determining that the at least one SSID received from the at least one device is a single SSID and that the received single SSID is not the SSID that identifies the specific wireless access point.

14. The computer according to claim 8, wherein the wireless connection setting program further comprises:

setting, for the computer, the SSID stored in the computer-accessible storage device so as to allow the computer to communicate with the at least one device via the specific wireless network, after setting, for the at least one device, the SSID that identifies the specific wireless access point via which the computer was joining the specific wireless network when the computer received the external setting request, as the setting value of the SSID setting item during execution of the SSID setting process.

15. A wireless network, comprising:

at least one device;

at least one computer that includes a communication interface configured to communicate with the at least one device, a processor, and a storage in which a wireless connection setting program is stored such that the wireless connection setting program is configured to be executed in response to the at least one computer receiving an external setting request for setting, for the at least one device, setting values of wireless connection settings to enable the at least one device join said wireless network via a wireless access point, the computer configured to start the wireless connection setting program in a state where the computer is joining a specific wireless network via a specific wireless access point identified by an SSID set for the computer, wherein the wireless connection setting program includes:

displaying an input screen image of a plurality of input screens, each designed for receiving an input for setting, for the at least one device, a setting value of at least one setting item of the wireless connection settings;

in response to receiving the input for setting, for the at least one device, the setting value of the at least one setting item corresponding to the displayed input screen image, setting, for the at least one device, a setting value of a setting item, corresponding to the received input, of the wireless connection settings for the at least one device; and executing an SSID setting process when setting, for the at least one device, a setting value of an SSID setting item of the wireless connections settings, the SSID setting item identifying a wireless access point for the at least one device to join the wireless network, the SSID setting process comprising:

transmitting an SSID detecting instruction to the at least one device via the communication interface of the computer, the SSID detecting instruction instructing the at least one device to detect each SSID of one or more wireless access points located around the at least one device by receiving a wireless signal via a wireless network interface of the at least one device;

receiving, from the at least one device, at least one SSID detected by the at least one device in response to the SSID detecting instruction;

determining whether the at least one SSID received from the at least one device is a single SSID, and whether the received single SSID is the SSID that identifies the specific wireless access point via which the computer was joining the specific wireless network when the computer received the external setting request;

in response to determining that the at least one SSID received from the at least one device is a single SSID and that the received single SSID is the SSID that identifies the specific wireless access point, setting the SSID that identifies the specific wireless access point as a setting value of the SSID setting item without displaying an SSID input screen image of the plurality of input screens, the SSID input screen image designed for receiving an input for setting, for the at least one device, the setting value of the SSID setting item;

in response to determining that the at least one SSID received from the at least one device is two or more SSIDs, or determining that the at least one SSID received from the at least one device is a single SSID and that the received single SSID is not the SSID that identifies the specific wireless access point, displaying the SSID input screen image; and when displaying the SSID input screen image, setting an SSID identified by an input received on the SSID input screen image, as the setting value of the SSID setting item.

16. The wireless network according to claim 15, wherein said displaying the input screen image includes displaying as one of the input screen images a setting device selecting screen image for selecting any one of the at least one device whose state is recognized as an intended device for which the wireless connection settings are to be configured, further comprising controlling whether to display another input screen image by preventing displaying the setting device selecting screen image in said displaying the input screen image, in response to the at least one device being only one, and wherein said setting a setting value of the setting item includes one of:

determining a device that is selected on the setting device selecting screen image as the intended device for which the wireless connection settings are to be configured, in response to the at least one device being two or more; and determining a device as the intended device in response to the device being the only one device.

17. The wireless network according to claim 15,
wherein the communication interface is configured to wirelessly communicate,
wherein the wireless connection settings include recognizing wireless networks including said wireless network through the communication interface,
wherein said displaying the input screen image includes displaying as one of the input screen images a wireless network selecting screen image for selecting any one of the wireless networks as an intended wireless network that the at least one device is to join,
further comprising controlling whether to display another input screen image by preventing displaying the wireless network selecting screen image in said displaying the input screen image where, the recognized wireless networks is recognized to be only one, and
wherein said setting a setting value of the setting item includes:
  determining a wireless network selected on the wireless network selecting screen image as the intended wireless network that the at least one device is to join, in response to the recognized wireless networks being two or more;
  configuring the wireless connection settings that may be used for making the at least one device join the selected wireless network;
  determining said wireless network as the intended wireless network in response to the recognized wireless networks being only one; and
  configuring the wireless connection settings that may be used for making the at least one device join said wireless network.

18. The wireless network according to claim 17,
wherein the wireless connection settings include recognizing whether a predetermined security function is set for the wireless network determined as the intended wireless network that the at least one device is to join in said configuring the wireless connection settings through the communication interface, and
wherein said displaying the input screen image includes displaying a warning screen image for warning that the predetermined security function is not set for the wireless network determined as the intended wireless network in said recognizing whether a predetermined security function is set for the wireless network determined as the intended wireless network, in response to the predetermined security function being not judged to be set for the determined wireless network.

19. The wireless network according to claim 15,
wherein the communication interface is configured to wirelessly communicate,
wherein the wireless connection settings include recognizing wireless networks through the communication interface,
wherein said displaying the input screen image includes displaying as one of the input screen images a wireless network selecting screen image for selecting any one of the wireless networks as an intended wireless network that the at least one device is to join,
further comprising controlling whether to display another input screen image by preventing displaying the wireless network selecting screen image in said displaying the input screen image, in response to the wireless networks recognized including a wireless network that the at least one computer is joining, and
wherein said setting a setting value of the setting item includes:
  determining the wireless network selected on the wireless network selecting screen image as the intended wireless network that the at least one device is to join, in response to the wireless networks recognized in said recognizing the wireless networks not including the wireless network that the at least one computer is joining;
  configuring the wireless connection settings that may be used for making the at least one device join the selected wireless network;
  determining the wireless network that the at least one computer is joining as the intended wireless network, in response to the wireless networks recognized in said recognizing the wireless networks including the wireless network that the at least one computer is joining; and
  configuring the wireless connection settings that may be used for making the at least one device join the wireless network that the at least one computer is joining.

20. The wireless network according to claim 15, wherein the wireless connection setting program further comprises:
  storing the SSID set for the computer into a computer-accessible storage device in the state where the computer is joining the specific wireless network via the specific wireless access point through the communication interface, during a time period between a time when the computer has received the external setting request and a time to start the SSID setting process; and
  after storing the SSID set for the computer into the computer-accessible storage device, changing the SSID set for the computer to an SSID that enables the computer to connect with the at least one device, so as to connect the computer with the at least one device via the communication interface, and
wherein the SSID setting program is configured to, in said determining, perform:
  when the at least one SSID received from the at least one device is a single SSID identical to the SSID stored in the computer-accessible storage device, determining that the at least one SSID received from the at least one device is a single SSID and that the received single SSID is the SSID that identifies the specific wireless access point; and
  when the at least one SSID received from the at least one device is a single SSID not identical to the SSID stored in the computer-accessible storage device, determining that the at least one SSID received from the at least one device is a single SSID and that the received single SSID is not the SSID that identifies the specific wireless access point.

21. The wireless network according to claim 15, wherein the wireless connection setting program further comprises:
  setting, for the computer, the SSID stored in the computer-accessible storage device so as to allow the computer to communicate with the at least one device via the specific wireless network, after setting, for the at least one device, the SSID that identifies the specific wireless access point via which the computer was joining the specific wireless network when the computer received the external setting request, as the setting value of the SSID setting item during execution of the SSID setting process.

* * * * *